Figure 1:
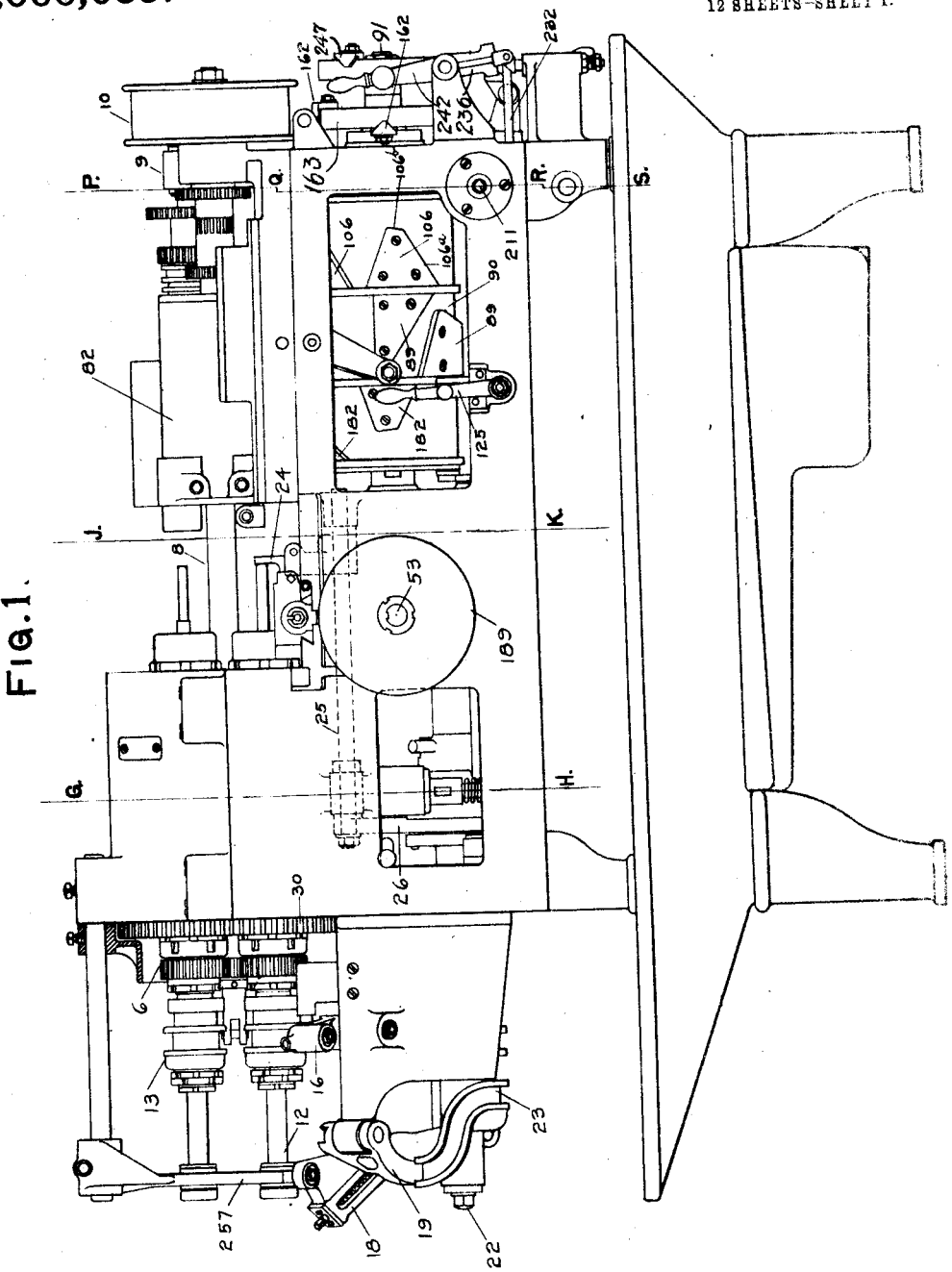

G. H. NEWTON.
SCREW MACHINE.
APPLICATION FILED AUG. 6, 1906.

1,066,035.

Patented July 1, 1913.
12 SHEETS—SHEET 4.

WITNESSES.
C. G. Bradley
Benjamin W. Gray

INVENTOR.
George H. Newton,
By Wilmarth H. Thurston,
Attorney.

G. H. NEWTON.
SCREW MACHINE.
APPLICATION FILED AUG. 6, 1906.
1,066,035.
Patented July 1, 1913.
12 SHEETS—SHEET 11.
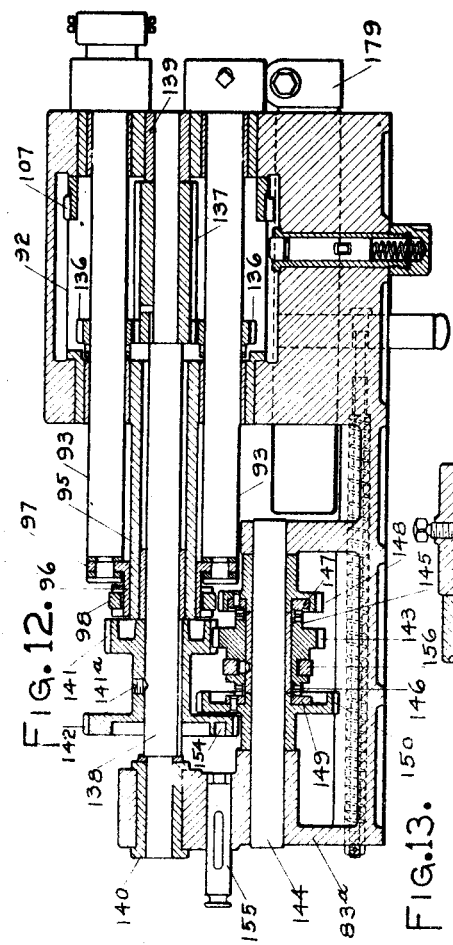
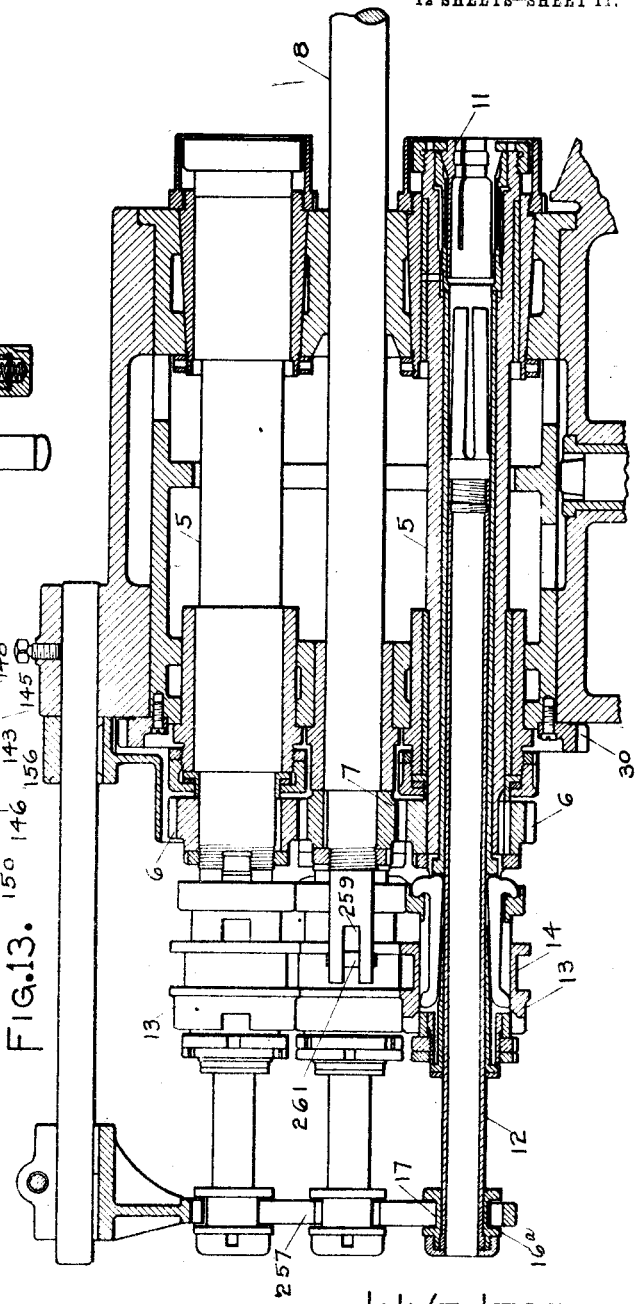
WITNESSES.
C. G. Bradley
Benjamin W. Guy
INVENTOR.
George H. Newton,
By Wilmarth H. Thurston,
Attorney.

G. H. NEWTON.
SCREW MACHINE.
APPLICATION FILED AUG. 6, 1906.
1,066,035.
Patented July 1, 1913.
12 SHEETS—SHEET 12.
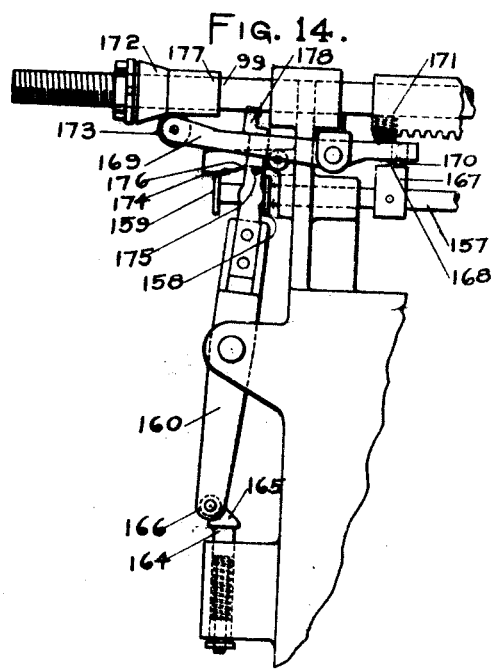
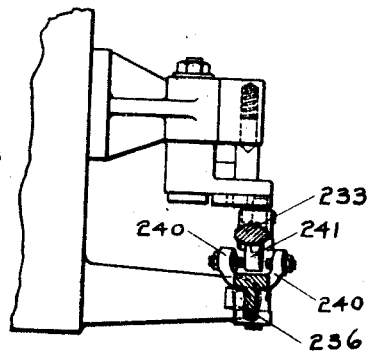
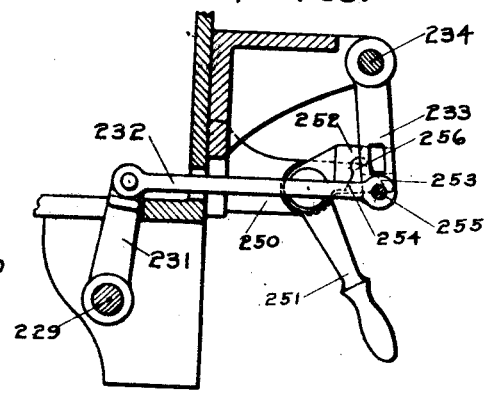
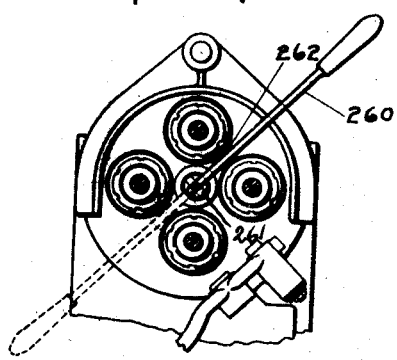
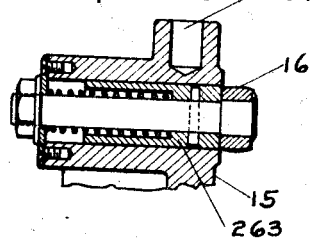
WITNESSES.
C. G. Bradley
Benjamin W. Iriry
INVENTOR.
George H. Newton,
By Wilmarth H. Thurston,
Attorney.

UNITED STATES PATENT OFFICE.

GEORGE H. NEWTON, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

SCREW-MACHINE.

1,066,035.      Specification of Letters Patent.      Patented July 1, 1913.

Application filed August 6, 1906. Serial No. 329,416.

*To all whom it may concern:*

Be it known that I, GEORGE H. NEWTON, of Providence, in the county of Providence and State of Rhode Island, have invented certain new and useful Improvements in Screw-Machines; and I do hereby declare the following specification, taken in connection with the accompanying drawings, forming a part of the same, to be a full, clear, and exact description thereof.

The invention relates to that class of screw machines in which a series of work-holding spindles is employed mounted in a turret, whereby several rods of stock may be simultaneously operated upon by a series of tools, and whereby by indexing said turret each rod of stock will be presented to and operated upon by each of said tools successively.

The object of the invention is to simplify and improve the construction and to increase the capacity of the machines of this class, and at the same time to provide a machine which shall be fully automatic in its operation and which may be readily adapted for the performance of a wide range of work.

In machines of the character referred to means require to be provided, not only for operating the chucks of the work-spindle and for feeding forward the rods of stock successively, but also for indexing the work-spindle turret to present each rod of stock to the successive tools. Means also require to be provided for locking the turret in its new position after each indexing movement thereof, and for unlocking said turret in advance of the next indexing movement. It is desirable that these several operations shall be performed with certainty at the proper times and in the proper order with relation to each other.

To that end one feature of the present invention consists in providing means whereby the mechanism for performing one of said operations will at the proper time set in motion the mechanism for performing the next succeeding operation.

A further feature of invention consists in indexing the work-spindle turret from an intermittently rotated constant speed shaft which is independent from the main cam-shaft of the machine, the time of the operation of such constant speed shaft being however controlled by said cam-shaft.

A further feature of invention consists in employing a number of separate carriers for the operating tools, with means for advancing said carriers at different speeds, whereby different tools or sets of tools carried by said carriers may be advanced at different speeds according to the character of said tools and the work to be performed thereby.

A further feature of invention consists in employing two or more tool-spindles mounted in a rotatable turret, said turret being so located with relation to one of the work-spindles that by indexing said tool-turret the tools therein may be caused to operate successively upon the rod of stock in said work-spindle without any intervening indexing of the work-spindle turret.

A further feature of invention consists in indexing said tool-turret from an intermittently rotated constant speed shaft which is independent from the main cam-shaft, the time of the operation of said constant speed shaft being however controlled by said cam-shaft.

A further feature of invention consists in providing means for simultaneously moving the tool-spindles lengthwise in said tool-turret and which will permit the said turret to be indexed whatever may be the lengthwise position of said tool-spindles.

A further feature of invention consists in providing means whereby the die-spindle may be rotated at two different speeds in the same direction and at a third speed in the opposite direction, and in addition means are provided for holding the die-spindle stationary, whereby by revolving the work always at the same speed four different relative speeds are provided for.

A further feature of invention consists in providing means whereby the length of the thread to be cut is determined and controlled by the lengthwise movement of the die itself in cutting the thread.

A further feature of invention consists in providing means whereby the operation of the stop which is employed for limiting or gaging the feed of the rod of stock is effected or controlled by the same shaft which operates the chuck and feed mechanisms, whereby said stop will always be moved into position to gage the feed of the rod at the proper time with relation to the operation of said feed mechanism.

The invention further consists in features of construction and in the combinations and arrangements of parts hereinafter described and claimed.

Figure 2:
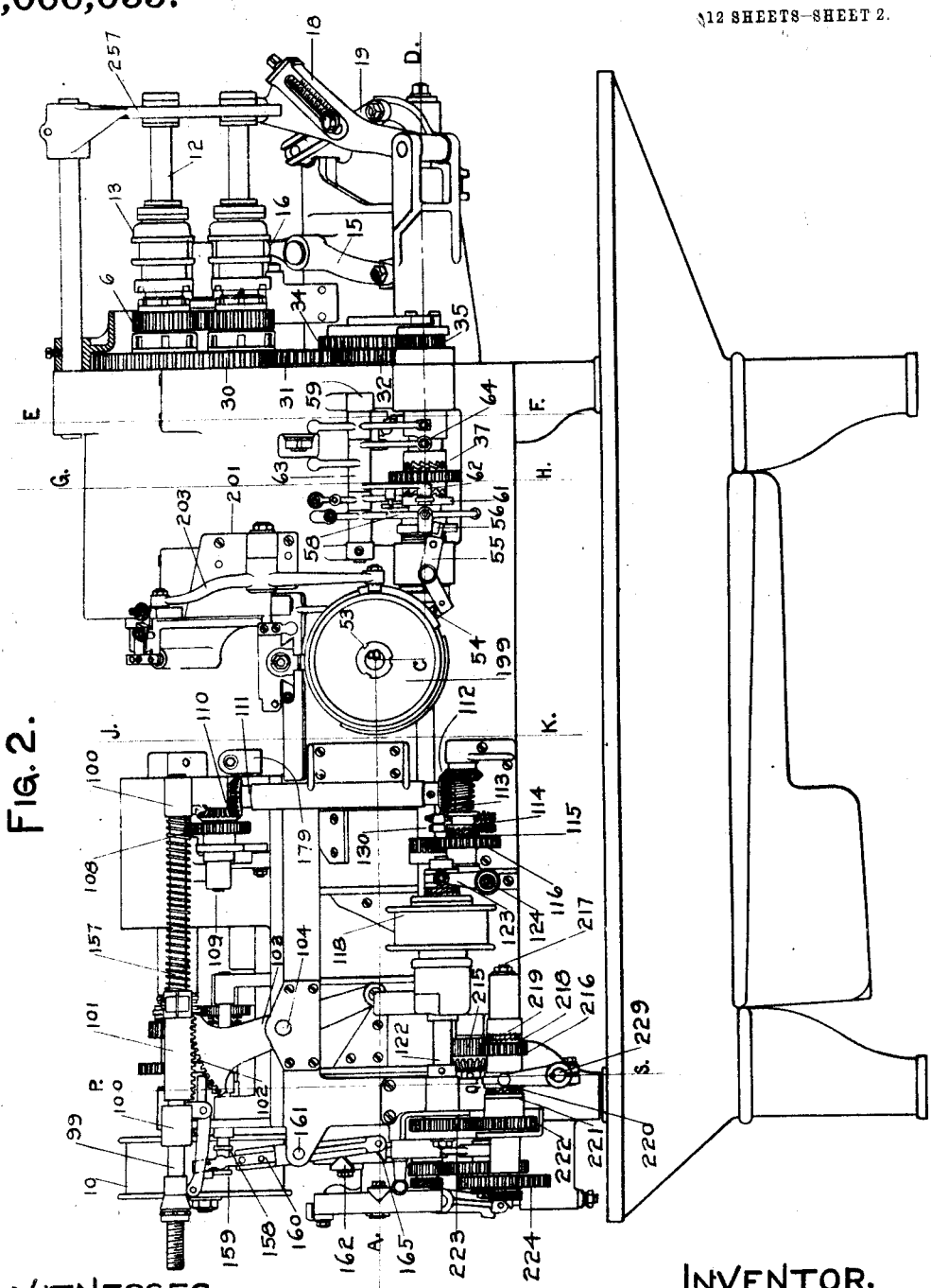
Figure 3:
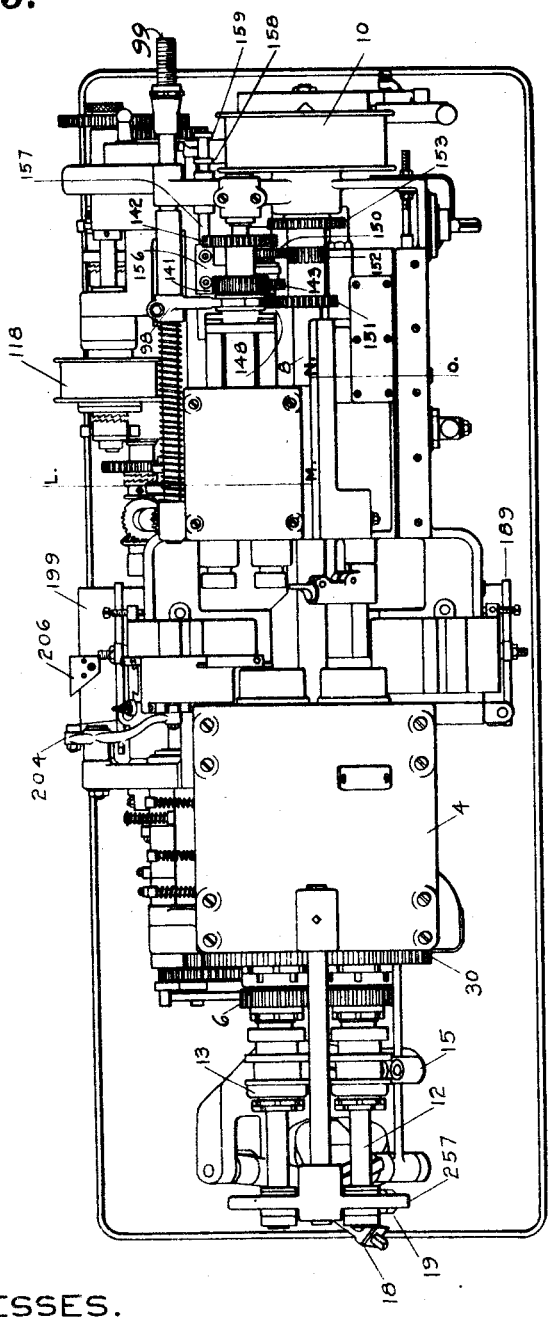
Figure 4:
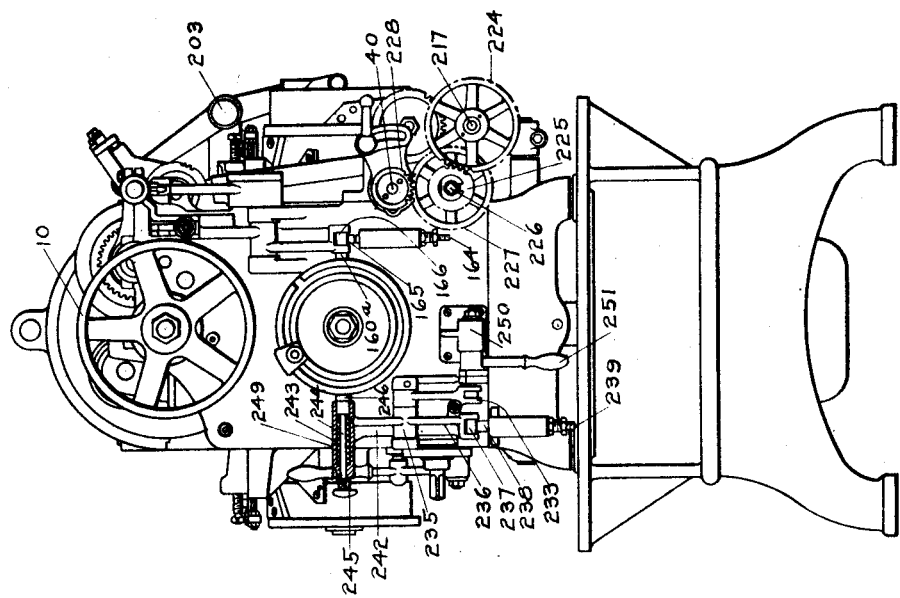
Figure 5:
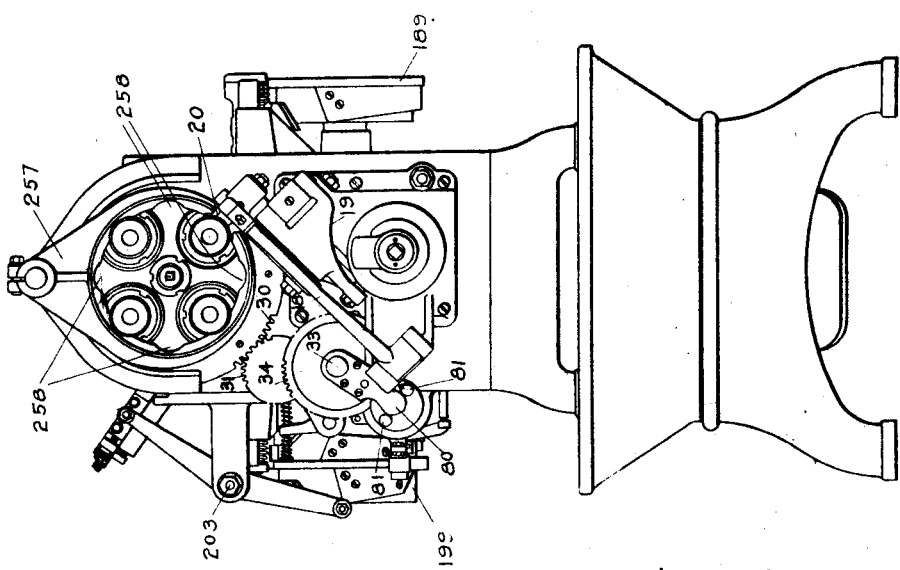
Figure 6:
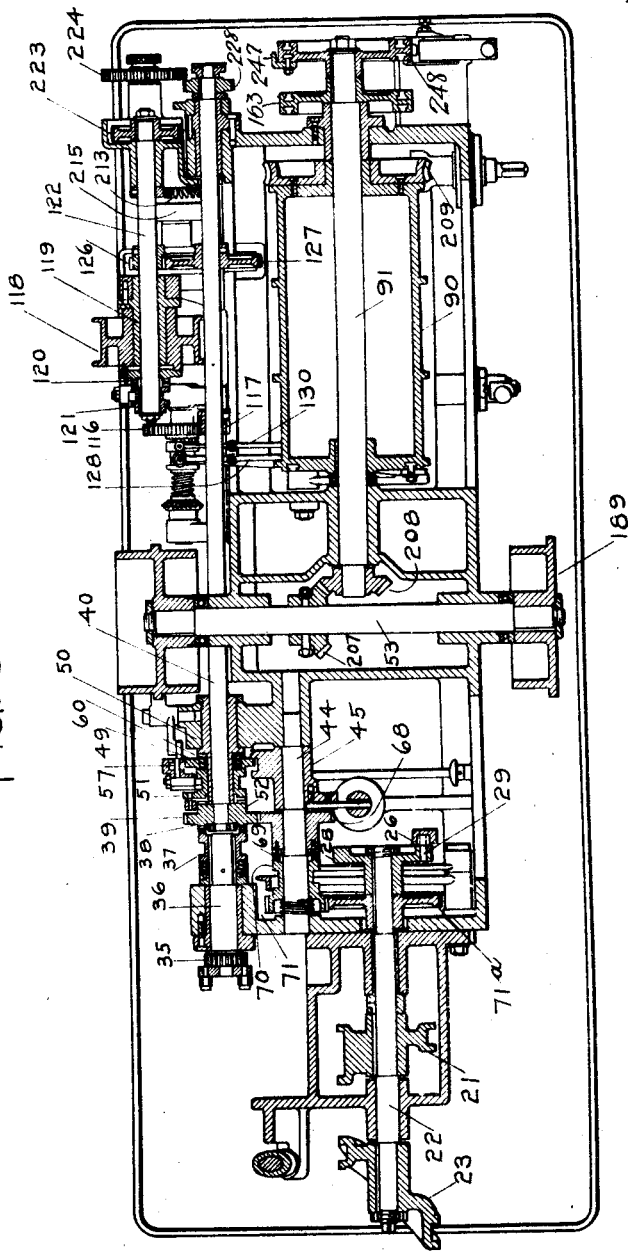
Figure 7:
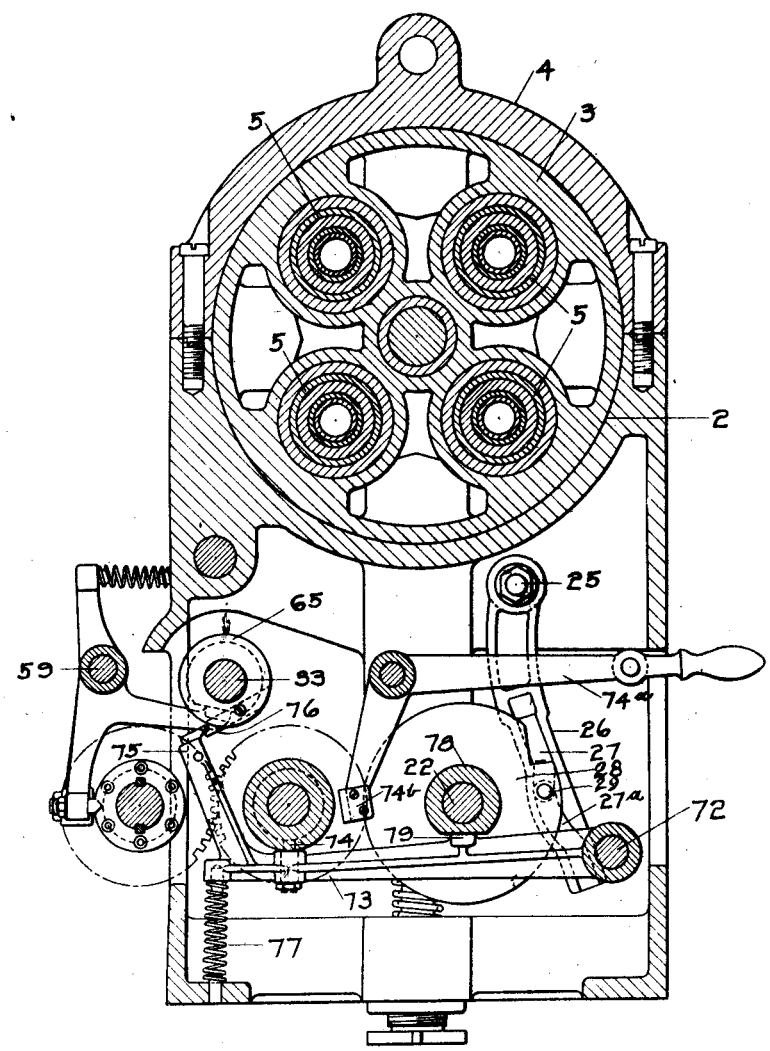
Figure 8:
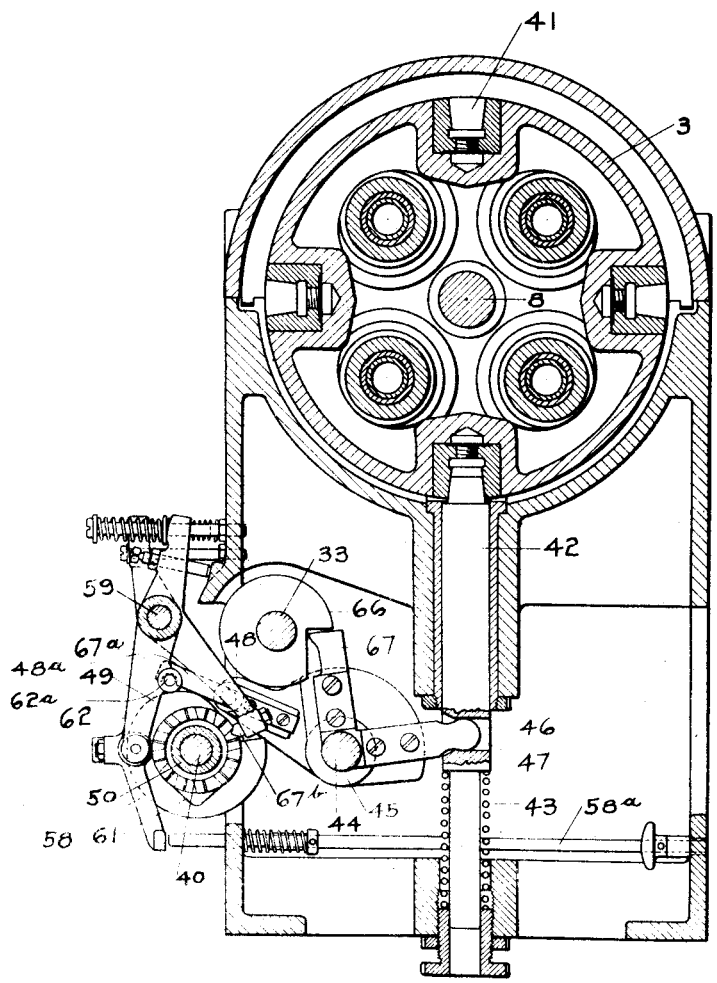
Figure 9:
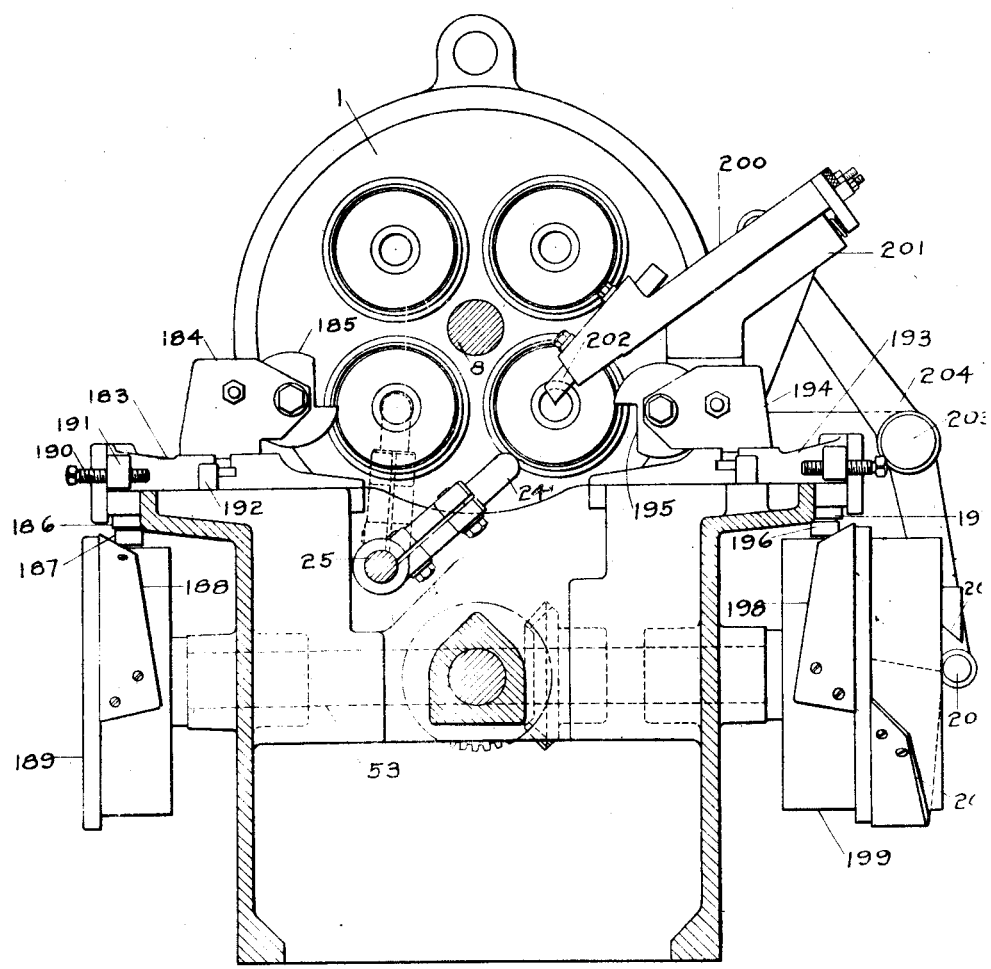
Figure 10:
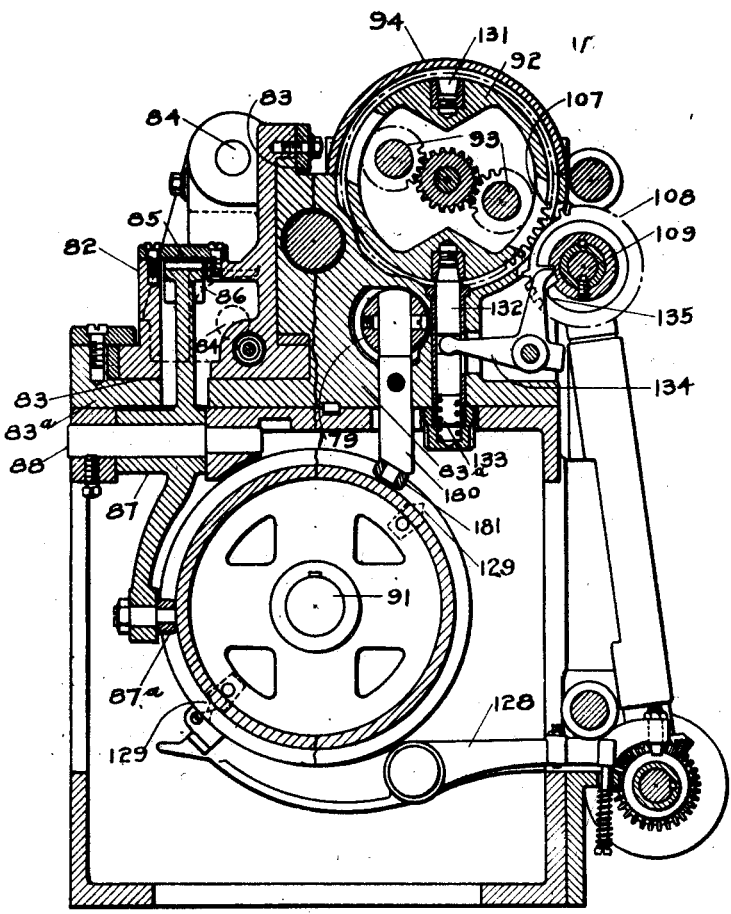
Figure 11:
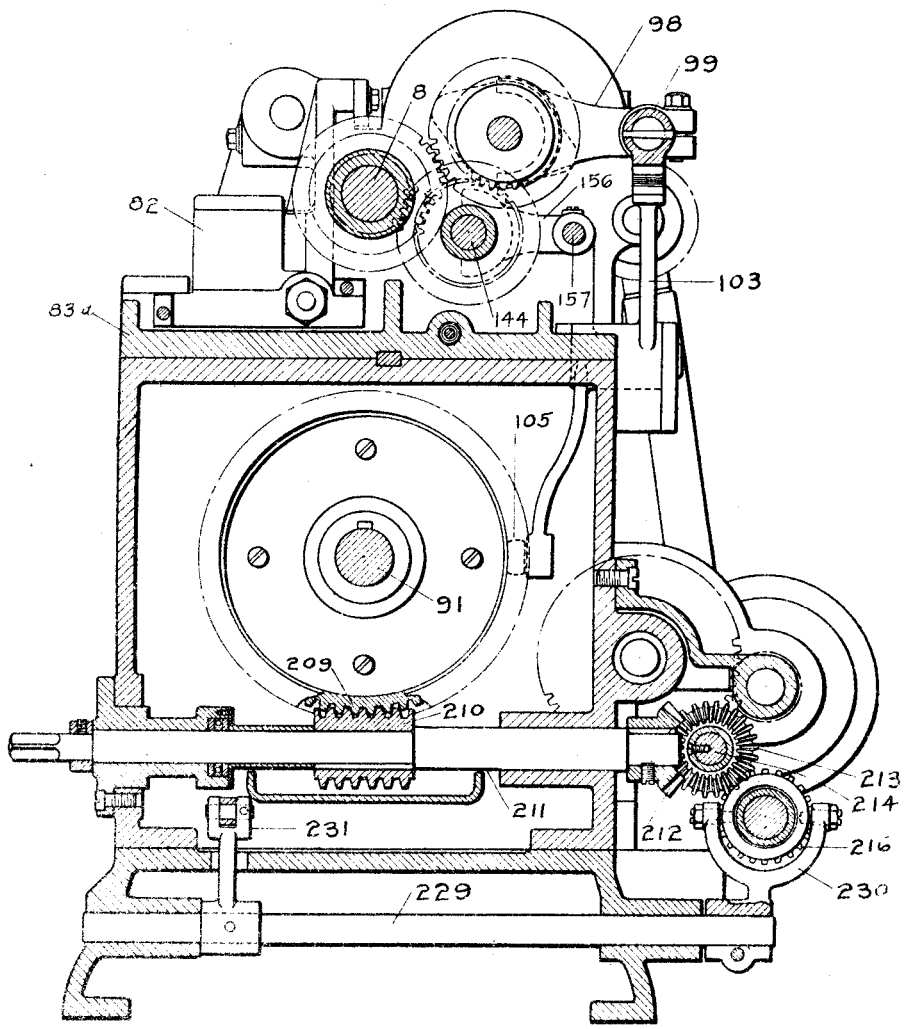

Referring to the drawings, Figure 1 is a front elevation of the machine. Fig. 2 is a rear elevation. Fig. 3 is a plan. Fig. 4 is an end elevation looking at the right hand end of the machine, as shown in Fig. 1. Fig. 5 is an end elevation looking at the left hand end of the machine, as shown in Fig. 1. Fig. 6 is a horizontal section on the line A—B—C—D of Fig. 2. Fig. 7 is a vertical transverse section on the line E—F— of Fig. 2. Fig. 8 is a vertical transverse section on the line G—H, Figs. 1 and 2. Fig. 9 is a vertical transverse section on the line J—K, Figs. 1 and 2, looking toward the work-spindle end of the machine. Fig. 10 is a vertical transverse section on the line L—M—N—O of Fig. 3. Fig. 11 is a vertical transverse section on the line P—Q—R—S of Fig. 2. Fig. 12 is a vertical longitudinal section through the axis of the die-turret and showing the turret partially revolved from the position shown in Fig. 10. Fig. 13 is a vertical longitudinal section through the axis of the work-spindle turret and showing the turret partially revolved from the position shown in Fig. 8. Figs. 14, 15, 16, 17 and 18 are detailed views of certain parts of the machine.

The frame 1 is provided at one end with a concave recess 2 in which the spindle-turret 3 is mounted, a cap 4 being secured to the frame to complete the housing for said turret, as shown in Fig. 7. As shown in the drawings the machine is provided with four work-spindles 5, but the number of work-spindles may be varied if desired. Each of said spindles is provided at its rear end with a gear 6, which gears mesh with a central gear 7 secured to the shaft 8 which extends axially through the spindle-turret, said spindle-turret constituting the support for said shaft at that end. At its opposite end said shaft 8 is supported in a bearing 9 and is provided at its outer end with a driving pulley 10.

Each of the spindles 5 is provided with a suitable work-holding chuck 11 and also with a feed-tube 12, which as shown are of the usual construction and require no further description. Mounted on each of said spindles 5 is a sliding collar 13 provided with a groove 14 for opening and closing the jaws of the chuck 11 in the usual manner. The chuck-operating lever 15 is suitably mounted so that the projection 16 therefrom will enter the groove 14 in each of the collars 13 successively as the spindle-turret is indexed, whereby the chuck in each of said spindles may be opened and closed at the proper times by the operation of said lever 15.

Each of the feed-tubes 12 has secured thereto a collar 16ª provided with a groove 17. The means for operating said feed-tubes consists of two levers 18 and 19 adjustably connected together, the construction being substantially the same as that shown and described in the patent to Gabriel, No. 786,353, said construction permitting adjustment to provide for different feeds as required. The lever 18 is provided with a projection 20 which is arranged to enter the grooves 17 in the collars 16ª successively as the spindle-turret is indexed, and so that each feed-tube may at the proper time be operated by said lever. The lever 15 for operating the chucks is acted upon by the cam 21 on the cam-shaft 22, and the lever 19 for operating the feed-tubes is acted upon by the cam 23 on said cam-shaft.

Instead of employing a fixed stop for limiting the forward movement of the rod of stock under the operation of the feed mechanism, a movable stop is employed, and the movement of this movable stop is controlled from the same cam-shaft that operates the feed mechanism. This movable stop 24 is best shown in Fig. 9, where said stop is shown as swung out of its operative position. Said stop 24 is secured to the rock-shaft 25 carrying a rock-arm 26, which rock-arm is provided with a slot 27, one portion 27ª of which is formed in the arc of a circle, as shown in Fig. 7. Secured on the cam-shaft 22 is a disk 28 carrying a pin 29, which enters the slot 27 in the rock-arm 26. With this construction, as will be seen, the means for swinging the stop 24 is operated by the same shaft as the feed-cam 23, and so that said swinging stop will at all times be operated in unison with the feed of the stock and so as to be brought into position with certainty at the proper time. When the swinging stop 24 has been swung into position in line with the rod of stock to be fed it is desirable that said stop shall retain this position for a sufficient length of time to perform its function, that is, from the time the end of the rod comes in contact with the stop until the chuck-jaws have closed upon the rod, and this result is obtained by means of the curved portion 27ª of the slot 27, which said curved portion will, when the stop is in the position referred to, be concentric with the axis of the cam-shaft 22, and so that while the pin 29 is traveling through said curved portion no movement will be imparted to the rock-arm 26.

For indexing the work-spindle turret said turret is provided with a gear 30 which meshes with an intermediate gear 31, which in turn meshes with a gear 32 on an intermediate shaft 33. Secured to said shaft adjacent to the gear 32 is a gear 34 which meshes with a gear 35 on a short intermittently rotating shaft 36, which shaft carries a sliding clutch-member 37 adapted to engage a clutch-member 38 formed on the gear 39 secured to a continuously rotating shaft 40. The means for shifting the clutch 37 will be hereafter described, but it will be understood that when the clutch-member 37 is shifted into engagement with the clutch-member 38, the shaft 36 will be rotated and through the intermediate gearing will rotate the work-spindle turret 3.

The work-spindle turret, after each indexing operation, is locked in position, and for this purpose the turret is provided with a series of recesses 41 adapted to be successively engaged by the locking-pin 42. Said locking-pin is acted upon by a spring 43 tending to move said pin in a direction to enter one of the recesses 41. For withdrawing the locking-pin the following means are provided: Mounted on a stationary shaft 44 is a sleeve 45 carrying a rock-arm 46 which engages a slot 47 formed in the locking-pin. Said sleeve 45 is also provided with a second rock-arm 48 which is arranged to be acted upon by the cam 49 loosely mounted on the sleeve 50. Formed integral with the cam 49 is a sliding clutch-member 51 adapted to engage a clutch-member 52 formed on the gear 39, the construction being such that the clutch-member 51 and the cam 49 slide together in throwing the clutch into and out of engagement. As will be seen, whenever the clutch-member 51 is thrown into engagement with the continuously rotating clutch-member 52 the rock-arm 46 will be operated by the cam 49 to withdraw the locking-pin.

It is desirable that the several operations required for presenting the rods of stock to the operation of the several tools, including both the feeding of the individual rods and the indexing of the turret to present a given rod to successive tools, shall take place successively at the proper times and in the proper order, and in the construction shown this result is secured by having the mechanism for performing one of the necessary operations set in motion the mechanism which performs the next succeeding operation. The several operations involved consist in first unlocking the spindle-turret, then indexing the spindle-turret and locking the same, then opening the chuck-jaws, then feeding forward the rod of stock, then closing the jaws, and finally drawing back the feed-tube. The several mechanisms for performing these successive operations, and the manner in which one mechanism sets in motion the next following mechanism, will next be described.

Referring to Figs. 2, 6, 7 and 8, the cam-shaft 53 extending crosswise of the machine is provided with a cam 54 carried by the cam-drum 199, to be hereafter more particularly referred to, which said cam engages and operates a lever 55. This lever 55 is provided with an inclined face 56 which engages a roll 57 mounted on the lever 58 pivotally mounted on a stationary shaft 59. A pin projecting from said lever 58 enters a cam-groove in the sliding clutch-member 51 and acts to normally hold said clutch-member out of engagement with the clutch-member 52. When the cam 54 operates to swing the lever 55, and thereby move the inclined face 56 beneath the roll 57, the lever 58 is raised and the pin referred to thereby withdrawn from the cam-groove in the sliding clutch-member, which clutch-member is then thrown into engagement with the clutch-member 52 by means of the spring 60 acting thereon. By the engagement of said clutch-members the cam 49 is thrown into operation, thereby serving to operate the rock-arm 46 to withdraw the locking-pin. Secured to or formed integral with said cam 49 is a cam 61 arranged to act on a lever 62 secured to or formed integral with a sleeve 63 loosely mounted on the shaft 59. Secured to or formed integral with said sleeve 63 is an arm 64 carrying a pin which enters a cam-groove formed in the sliding clutch-member 37. With this construction, as will be seen, the operation of the mechanism which serves to unlock the turret serves to operate the cam 61, which in turn serves to release the sliding clutch-member 37 and permit the same to be thrown, by the action of its spring, into engagement with the clutch-member 38, thereby causing the short shaft 36 and the connecting gearing to be operated to index the turret. It will be further seen that as the operation of the intermittently rotated constant speed shaft 36 for indexing the turret is thus controlled by the turret unlocking mechanism, and as the operation of said unlocking mechanism is in turn controlled by the main cam-shaft 91, the operation of said indexing-shaft 36 is primarily controlled by said cam-shaft and is secondarily controlled by said unlocking mechanism.

With the construction as thus far described it would be possible to release the indexing clutch and start the indexing mechanism by moving the lever 62 by hand without first operating the turret-unlocking mechanism. To prevent this being done and to insure that the indexing clutch shall not be thrown in and the indexing mechanism started unless the turret-unlocking mechanism has previously operated, a safety device is provided as follows: The lever 62 is provided with a pin or projection 62ª, and the sleeve 45 carrying the rock-arm 48 is provided with a hook or latch 48ª adapted to hook over or engage said pin 62ª when the parts are in the position shown in Fig. 8 in which the turret is locked. By this construction the lever 62 cannot be moved until the latch 48ª has become disengaged from the pin 62ª, and such disengagement will be effected only by the operation of the unlocking mechanism to unlock the turret. The lever 58 is a spring-pressed lever, and as soon as the cam 54 has passed by so as to permit such movement, the action of the spring pressing on said lever 58 will, by the bearing of the roller 57 on the inclined face 56, operate to move said inclined face from beneath the roller and permit the pin which projects from the lever 58 to enter the cam-groove in the sliding clutch-member 51. As said clutch-member revolves, the cam in the groove thereof will operate by engagement with the pin projecting from the lever 58, which constitutes a fixed abutment, to withdraw said clutch-member 51 from the clutch-member 52 and thus stop the rotation of the cams 49 and 61. It will be understood that said clutch-member 51 and the cams 49 and 61 are thrown out when they have made one revolution.

With the arrangement of gearing shown it is necessary, in order to give to the spindle-turret a quarter turn, that the clutch-member 37 should make three revolutions before being thrown out, and for this purpose the following means are provided: Secured to the shaft 33 is a cam 65 which underlies the arm 64, said cam 65 being so constructed and so timed as to hold the arm 64 in its raised position and, with its pin, out of the cam-slot in the clutch-member 37 until said clutch-member has made nearly three revolutions, and to then release said arm 64 to permit the pin to enter said cam-slot to effect the disengagement of the clutch-member 37 when it has made three revolutions. With this construction it is also necessary that the locking-pin 42 should be held out of engagement with the turret while the clutch-member 37 is making its three revolutions, and for this purpose the shaft 33 is provided with another cam 66, and the sleeve 45 is provided with another arm 7 arranged to be acted upon by said cam 66. Said cam 66 is timed to follow the cam 49, and so that after the cam 49 has acted to withdraw the locking-pin 42 said cam 66 will operate to hold said locking-pin in its withdrawn position until the clutch-member 37 has made its three revolutions. When the cam 66 has moved to a position to release the locking-pin 42, said locking-pin will be thrown into engagement with the proper recess in the turret by the action of its spring 43. It is desirable to provide means to give a slight further sliding movement to the clutch-member after the clutch-teeth have separated and to yieldingly hold the clutch in its withdrawn position, and such means is provided and consists of the spring-pressed stop-lever 67ª carrying a pointed pin 67ᵇ adapted to engage a corresponding recess in the clutch-member.

The next operations in sequence are the opening of the chuck-jaws, the feeding forward of the rod of stock, the closing of the chuck-jaws and the drawing back of the feed-tube, all of which operations are effected by the cams on the cam-shaft 22, as follows: Loosely mounted on the shaft 44 is a gear 68 which meshes with the gear 39 and is thus continuously rotated. This gear is provided with a clutch-member 69. Mounted to slide on the shaft 44 is a fellow clutch-member 70 provided with a cam-groove and acted upon by a spring. This clutch-member 70 is provided with a gear 71 which meshes with a gear 71ª secured to the cam-shaft 22. Pivoted to a stud 72 is a lever 73 arranged to underlie the sliding clutch-member 70 and provided with a pin 74 adapted to enter the cam-groove in the clutch-member 70. Projecting upwardly from the lever 73 is an arm 75 arranged to lie in the path of a toe 76 carried by the cam 65. The lever 73 is acted upon by a spring 77 which tends to move the pin 74 into the cam-groove of the clutch-member 70. With this construction when the clutch-member 37 is thrown into operation and the shaft 33 thereby operated, the revolution of said shaft 33 will cause the toe 76 to swing the lever 73 downward and so as to withdraw the pin 74 from the cam-groove of the clutch-member 70, thereby permitting said clutch-member to be thrown by its spring into engagement with the clutch-member 69, thus causing the clutch-member 70 to be rotated and causing a corresponding rotation of the cam-shaft 22. Thus the throwing into operation of the clutch-member 37 for the purpose of indexing the turret in turn throws into operation the clutch-member 70 for the next succeeding operations, viz., the opening of the chuck-jaws, which is effected by the cam 21, and the operation of the feed mechanism which is effected by the cam 23, both on the cam-shaft 22. The proper operation of the feed-mechanism with respect to the opening of the chuck-jaws is provided for by a proper timing of the cam 23 with relation to the cam 21.

While in the ordinary operation of the machine it is desirable to thus have the chuck-mechanism and feed-mechanism thrown into operation by the operation of the mechanism for indexing the work-spindle turret, there are times when it may be desirable to index the turret without its being followed by the operation of the chuck-mechanism and the feed-mechanism, as for instance, in setting up the machine it may be desirable to have one of the rods of stock operated upon by the several tools without having the tools operate upon the other rods and thus without having the other rods fed forward. For this purpose means are provided whereby the cam-shaft 22 will be prevented from being thrown into operation by the operation of the indexing mechanism. Such means consists of a hand-lever 74$^a$ carrying a block 74$^b$ (see Fig. 7), which block may, by the operation of said lever, be moved into the groove in the clutch-member 70, and so that when this is done said clutch-member 70 will be thereby prevented from being moved by its spring into engagement with the clutch-member 69, when the pin 74 is withdrawn by the operation of the indexing mechanism.

If desired the gears 71 and 71$^a$ may be of equal size, in which case the clutch-member 70 would be thrown out when it had made one revolution. As shown in the drawings, however, the gear 71$^a$ is twice as large as the gear 71, and so that, in order for the cam-shaft 22 to make one revolution, it is necessary that the gear 71 shall make two revolutions and consequently necessary that the clutch-member 70 shall not be thrown out until it has thus made two revolutions. This is effected by means of a cam 78 on the shaft 22 (see Fig. 7) arranged to operate upon a suitable projection 79 on the lever 73, and to hold said lever depressed until the clutch-member 70 has made nearly two revolutions, and to then release said lever to enable the pin 74 to enter the cam-slot in the clutch-member 70 to cause said clutch-member to be thrown out when it has made its two revolutions.

It is preferred to provide the gears 34 and 35 with devices for slowly and easily starting and stopping the turret in its indexing movement, and such devices are shown in Fig. 5 comprising a cam-lever 80 secured to the gear 34 adapted to engage pins 81 on the gear 35, a portion of the teeth of the gear 35 being removed to permit the operation of said cam-lever and pins in the manner described in the patent to Gabriel, No. 786,353.

Referring now to the arrangement and means for operating the several tools which are to operate upon the rods of stock, instead of mounting all of said tools in a single carrier, three separate carriers are provided. One tool-carrier 82 is mounted to slide on ways 83 formed on the bed-plate 83$^a$. This carrier 82 is provided with two tool-sockets 84 which are in line with two of the work-spindles 5, viz., the two work-spindles at the right of the spindle-turret axis, as shown in Fig. 7. The mechanism for advancing and retracting the tool-carrier 82 is as follows: The tool-carrier is provided with a rack 85 arranged to be engaged by a gear-segment 86 formed on the end of a lever 87 pivoted on a stud 88. The lower end of the lever 87 is provided with a roll 87$^a$ arranged to be acted upon by cams 89 on the cam-drum 90 secured to the cam-shaft 91. The tool-carrier 82 may be provided with any suitable tools for the performance of the work in hand, and ordinarily will be provided with two turning-tools, one for taking a roughing cut and the other for taking a finishing cut.

The next carrier 92 is especially designed for carrying dies for cutting screw-threads, and this carrier is in the form of a rotary turret provided with any desired number of die-spindles 93, two such die-spindles being shown in the drawings. The turret 92 is mounted for rotation in a concave recess formed in the bed-plate 83$^a$, the cap 94 being secured to the bed-plate above the turret to form a housing for the same.

In the construction shown the die-spindles 93 are mounted to be moved longitudinally in the turret 92 for the purpose of advancing and retracting the dies carried by said spindles, but if desired, instead of having the die-spindles longitudinally movable in the turret 92, the said turret itself may be advanced and retracted for the purpose of advancing and retracting the dies. So also in the construction shown the two die-spindles 93 are connected together, and so that both of said spindles will be advanced and retracted simultaneously, but if desired, instead of having the two die-spindles thus connected, a construction may be employed by means of which the two die-spindles may be advanced and retracted separately instead of simultaneously. The means for thus advancing and retracting the die-spindles are as follows: The turret 92 is provided with a hollow axial projection 95 on which is mounted a sliding collar 96 provided with an annular flange 97, to which flange the ends of the die-spindles are connected in any suitable manner, and so that a longitudinal movement of the collar 96 will be accompanied by a corresponding longitudinal movement of both of the die-spindles. The collar 96 is provided with a groove to receive a fork 98 adjustably secured to a rod 99. This rod 99 is mounted to reciprocate in bearings 100, and is provided with a rack 101 adapted to be engaged by a segment-gear 102 formed on the end of a lever 103 pivoted at 104. The lower end of said lever is provided with a roll 105 adapted to be engaged by the cams 106 on the cam-drum 90.

The die-spindle is advanced to bring the die into engagement with the rod to be threaded by means of the cam 106 acting upon the lever 103 through the rod 99 and the connections from said rod to the die-spindle. It is preferred to provide means for positively starting the die on to the work, and then to allow the die to be drawn on to the work solely by its own lead, and the cam 106 is so shaped and the construction is such as to produce these results. Thus the cam 106 is provided with two angular faces 106ª and 106ᵇ preferably of different inclinations. The angular face 106ª serves to advance the die-spindle so as to bring the die in contact with the end of the rod to be threaded, and then the incline 106ᵇ, which is comparatively short, serves to positively start the die on to the rod. When the die has thus been started on, the further advancing movement of the die will be controlled solely by the lead of the die itself, and the cam 106 will have no further effect thereon, the roll on the lower end of the lever 103 having at this time passed away from said cam, and the die being, with the construction shown, what is termed a "floating" die, that is, the die, together with its spindle, being free to move lengthwise under the action of the lead of the die on the rod which is being threaded.

By making the fork 98 adjustable on the rod 99 the threading of screws of different lengths may be provided for without changing the cam 106. Thus to whatever extent the rod may project from its chuck, the distance between the position of the die before it begins to advance and the end of the rod may be made always the same by simply adjusting the fork 98 along the rod 99, so as to bring the die at the required distance from the end of the rod, this distance being the distance which the die will be advanced by the incline 106ª on the cam 106.

The means for indexing the die-spindle turret are as follows: The turret is provided with a gear 107 which is engaged by a gear 108 secured to an intermittently rotating shaft 109. The shaft 109 is connected by bevel-gears 110 with a shaft 111, which shaft is connected by bevel gears 112 with a shaft 113 on which is mounted a sliding clutch-member 114 adapted to engage a clutch-member 115 formed on the gear 116 which is loosely mounted on the shaft 113. The gear 116 meshes with a gear 117 mounted on the shaft 40. The driving pulley 118 is loosely mounted on a fixed sleeve 119, which sleeve is suitably supported in a bracket secured to the bed of the machine. The pulley 118 is provided with a clutch-member 120 adapted to be engaged by a sliding clutch-member 121 mounted to slide on the shaft 122. The clutch-member 121 is operated by a forked arm 123 secured to a rock-shaft 124 which extends across the machine and is provided at its opposite end with a hand-lever 125. The shaft 122 is provided with a gear 126 which meshes with a gear 127 secured to the shaft 40 and through which gears said shaft 40 is continuously driven.

The operation of the sliding clutch-member 114 and the resulting indexing of the die-spindle turret is controlled in the following manner: Overlying the clutch-member 114 is a lever 128 carrying a pin adapted to enter the cam-groove in said clutch-member. The opposite end of this lever 128 is arranged to be operated upon by a cam 129 carried by the cam-drum 90. As the die-spindle turret is to be indexed twice for each revolution of the cam-shaft 91, two cams 129 are provided, as shown in Fig. 10. When the lever 128 is operated to withdraw its pin from the cam-groove in the clutch-member 114 said clutch-member will, by the action of its spring, be thrown into engagement with the clutch-member 115 and the clutch-member 114 thus be revolved and the rotation of which, through the connecting gearing, will impart the necessary partial rotation or indexing movement to the die-spindle turret. The clutch-member 114 makes one revolution, and the interposed gearing is of such character that this one revolution of said clutch-member will cause the die-spindle turret to be given a half revolution. It will be understood that if more than two die-spindles be carried in the turret the interposed gearing will be changed accordingly. When the clutch-member 114 has made nearly one revolution it is thrown out by the engagement of the cam in the cam-groove of the clutch-member with the pin carried by the lever 128, and the final movement of said clutch-member is given thereto by means of a spring-pressed stop-lever 130 which operates in a similar manner to the stop-lever 67ª before referred to.

The mechanism for locking and unlocking the die-spindle turret is as follows: Said turret is provided with two recesses 131 adapted to be engaged by the locking-pin 132 acted upon by a spring 133. For withdrawing said locking-pin one arm of a bell-crank lever 134 engages a slot in the locking-pin, and the other end is arranged to be engaged by a cam 135 on the shaft 109, said cam being timed to withdraw and release the locking-pin at the proper times. In order to enable the locking-pin to be withdrawn before motion is imparted to the die-spindle turret 92 to index the same, a number of teeth are omitted from the gear 108, the locking-pin being withdrawn during the time when this blank space on the gear 108 is passing the teeth of the gear 107 on said turret. When two die-spindles are employed as shown in the drawings, one of these spindles is provided with what may be called a "roughing die" for partially forming the screw-thread on the rod of stock, and the other is provided with a finishing die for finishing said thread. It will be understood that the die-spindles are advanced for the roughing die to make its partial cut, and are then retracted and the die-spindle turret indexed, and the die-spindles again advanced for the finishing die to make its cut without any intervening indexing of the work-spindle turret. It will also be noted that the die-spindles are always in connection with the means for advancing and retracting the same, and that thus the die-spindle turret may be indexed in any position of the die-spindles and without affecting the connection between the die-spindles and the means for advancing and retracting the same.

The means for rotating the die-spindles will next be described. In the construction shown means are provided for rotating the die-spindles at two different speeds in the same direction and for rotating said die-spindles at a third speed in the opposite direction, and means are also provided for holding the die-spindles against rotation.

Referring to Figs. 1, 3 and 12, each of the die-spindles 93 is provided with a gear 136, which gears mesh with an elongated pinion 137 secured to a shaft 138 which extends axially of the turret and is supported at its forward end in a bearing 139 formed in the turret and at its opposite end in a bearing 140 formed in the bed-plate 83ᵃ. Keyed to the shaft 138 is a double gear 141, 142. The gear 141 engages a gear 143 loosely mounted on a shaft 144 and arranged to slide thereon, and said gear is provided at one end with a clutch-member 145 and at the other end with a clutch-member 146. The clutch-member 145 is adapted to engage a clutch-member 147 carried by the gear 148. The clutch-member 146 is adapted to engage the clutch-member 149 carried by a gear 150 loosely mounted on said shaft 144. Keyed to the shaft 8 is a double gear 151, 152, the gear 151 meshing with the gear 148 and the gear 152 meshing with the gear 150. It will be noted that the gear 150 is of larger diameter than the gear 148, and also that the gear 151 is of larger diameter than the gear 152, and so that the speed imparted to the gear 148 will be materially greater than the speed imparted to the gear 150. When, therefore, the gear 143 is shifted so as to engage the clutch-members 146 and 149, and said gear 143 thereby connected to the gear 150, said gear 143 will be revolved at one speed while, when the gear 143 is shifted in the opposite direction, and so as to engage the clutch-members 145 and 147 and thereby connect said gear 143 with the gear 148, said gear 143 will be rotated at a greater speed than before. Thus the die-spindles will be rotated at one or the other of two different speeds, but in the same direction, according as the gear 143 is in engagement with the gear 150 or the gear 148. This rotation of the die-spindle at two different speeds in the same direction is useful in connection with the threading operation to be hereinafter described. The double gear 141, 142 is normally secured against longitudinal movement on the shaft 138 by means of a set screw 141ᵃ. If it be desired to rotate the die-spindles in the opposite direction this may be done by loosening said set screw and shifting said double gear lengthwise on the shaft 138 and so as to bring the gear 142 into engagement with the gear 153 keyed to the shaft 8, thereby directly connecting the shaft 8 with the shaft 138 and cutting out the intermediate shaft 144. By properly proportioning the gears the die-spindles when thus rotated in the opposite direction may be rotated at any desired speed, and with the gearing shown in the drawings it is arranged to be rotated at a different speed from either of the speeds imparted thereto in the other direction. It is to be noted that when the double gear 141, 142 is shifted to bring the gear 142 into engagement with the gear 153 the gear 141 is thrown out of engagement with the gear 143. It may also sometimes be desired to hold the die-spindles against rotation, and means are provided for this purpose. Assuming the gear 142 to be out of engagement with the gear 153, as shown in Fig. 3, the double gear 151, 152, which is keyed to the shaft 8 may be shifted lengthwise of said shaft, so as to throw said gears out of engagement with the gears 148 and 150, thereby breaking all connection between the shaft 8 and the die-spindles and preventing any rotation thereof. In order to firmly hold the die-spindles stationary the gear 142 is provided with a recess 154 adapted to be engaged by the sliding pin 155 mounted in the bed-plate.

As will be more fully explained hereafter, the die-spindle is rotated at its slow speed in cutting the thread and is rotated at its higher speed in running off the die. It will be understood, therefore, that the shifting of the gear 143 and the clutches carried thereby to change the speed of the die from a low to a high speed is to be made when the cutting of the thread has been completed, and it will be further understood, therefore, that the length of the thread will be determined by the time of the shifting of said gear and clutches in the direction to change from the low speed to the high speed. The mechanism for shifting said gear 143 and the clutches carried thereby is of such character that the shifting of said gear and clutches to change from the low speed to the high speed is effected or controlled not by an independently operated cam, but by the lengthwise movement of the die-spindle itself, and with such mechanism, therefore, the length of the thread may be accurately determined and uniformly maintained, because the lengthwise movement of the die in cutting the thread controls the change of speed of the die to effect the running off thereof.

Referring to Figs. 2, 3, 12 and 14, the hub of the gear 143 is provided with a groove to receive a shifter fork 156 carried by the sliding rod 157, which rod is provided at its outer end with collars 158, 159. A shifting lever 160 is pivoted at 161 to the frame, the upper end of which lever is arranged to lie between the collars 158, 159, and the lower end of which lever carries a roll 160ª arranged to be acted upon by cams 162 on the cam-wheel 163 carried by the cam-shaft 91. Arranged below the lower end of said lever 160 is a spring-pressed plunger 164 provided with a wedge-shaped head 165 adapted to engage the roll 166 carried by the lower end of the lever 160. With this construction the actual shifting of the gear 143 and the clutches carried thereby is effected in both directions, not by the cams 162, but by the spring-pressed plunger 164, and the primary purpose of such spring-pressed plunger is to shift said gear and its clutches more quickly than could be done by the cams. With the present construction the employment of the spring-pressed plunger serves a further and important purpose in enabling the shifting of said gear and clutches to be controlled by the lengthwise movement of the die-spindle, for the reason that when such spring-pressed plunger is employed for shifting the clutches said plunger may be moved by the cam to a position to put its spring under tension, but not sufficiently far to shift the clutches, and may then be latched in this position so that the actual shifting of the clutches will be controlled by the unlatching of said plunger, which unlatching may in turn be controlled by the lengthwise movement of the die-spindle, whereby the length of the thread will be determined and the change of speed of the die-spindle effected or controlled by the lengthwise movement of the die itself in cutting the thread. Inasmuch as this control of the shifting of the clutches by the lengthwise movement of the die-spindle is important only in changing the speed of the die-spindle from the low speed to the high speed to stop the cutting of the thread and to effect the running off of the die, the latching of the spring-pressed plunger in the manner referred to need only take place in connection with the shifting of the clutches to change from the low speed to the high speed, and the shifting of the clutches in the opposite direction to change from the high speed to the low speed may be effected by the spring-pressed plunger immediately after the roll on the shifting lever has passed the apex of the wedge-shaped head of said spring-pressed plunger.

The mechanism for latching the spring-pressed plunger in the manner above referred to, and for controlling the shifting of the clutches in changing from the low speed to the high speed is as follows: Secured to the sliding-rod 157 is a collar 167 provided with a latch-projection 168. Pivoted to the frame is a lever 169 provided with a latch 170 adapted to engage the latch-projection 168. A spring 171 acts upon said lever to keep the latch in engagement. Adjustably secured to the sliding rod 99 is a conical collar 172 adapted to engage a roll 173 on the end of the lever 169. With this construction the operation is as follows: Assuming the parts to be in the position shown in Fig. 14, and which is the position which the parts occupy just before the cutting of the thread has been completed and after the cam 162 has acted to shift the lever 160, as will be seen, the lever has been shifted by the cam only far enough to carry the roll 166 just past the apex of the wedge-shaped head 165 of the spring-pressed plunger. As will be further seen, with the parts in the position shown the spring-pressed plunger is prevented from shifting the lever any farther by reason of the engagement of the latch-projection 168 with the latch 170, which latch, so long as it remains in engagement with said latch-projection 168, serves to prevent any further movement of the sliding-rod 157. As now the die-spindle continues to advance in cutting the thread, the conical collar 172 on the rod 99 (which rod is connected to and moves with the die-spindle in its lengthwise movement) will be brought into engagement with the roll 173 on the end of the lever 169, and as the die-spindle and rod 99 continue to advance, said conical collar 172 will act to depress that end of said lever, thereby raising the opposite end and lifting the latch 170 out of engagement with the latch-projection 168, thereby releasing the sliding rod 157 and permitting the spring-pressed plunger to operate to move said rod 157 so as to shift the gear 143 and the clutches carried thereby and thus change the speed of the die-spindle from the slow speed to the fast speed, which will result in stopping the cutting of the thread and cause the running off of the die to begin.

It will be noted that as the latch 170 is in engagement with the projection 168 during the cutting of the thread, the clutch-member 146 will be positively held in engagement with the clutch-member 149 during such operation. It is desirable that during the running off of the die the clutch-member 145 should likewise be held positively in engagement with the clutch-member 147, and means are provided for that purpose. Pivoted to the frame is a latch-lever 174 adapted to engage the collar 159 on the sliding-rod 157 when said rod has been shifted in the direction to engage the clutch-member 145 with the clutch-member 147. As will be seen, the sliding-rod 157 will be held in that position, and said clutch-members will be held in engagement, as long as said latch 174 remains in engagement with the collar 159. For the purpose of disengaging said latch 174 the lever 160 is provided with a pin 175 arranged to underlie the cam-surface 176 on said latch-lever. When the lever 160, therefore, is shifted in the opposite direction the engagement of the pin 175 with said cam-surface will serve to unlatch said latch-lever 174 to permit the shifting of the sliding-rod 157. It will be noted that the distance between the collars 158 and 159 is such as to provide a certain amount of lost motion for the lever 160 to permit said lever to be operated by the cams 162.

In order to guard against the contingency that the spring-pressed plunger 164 may for any reason fail to act to shift the lever 160 when permitted to do so, additional means are provided for positively shifting said lever. The adjustable collar 172 is provided with an extension 177, and the lever 160 is provided with an upward extension 178 arranged to lie in the path of said collar extension 177. These parts are so arranged that if the lever 160 has not been shifted by the spring-pressed plunger the extension 177 will, by the advancing movement of the rod 99, be brought into engagement with the lever extension 178, and the continued movement of said rod 99 will in such case positively shift the lever 170 and the clutches operated thereby.

It will be noted that by adjusting the position of the collar 172 on the rod 99 the time when the lever 160 is permitted to be shifted by the spring-pressed plunger in changing from the slow speed to the fast speed may be varied with respect to the lengthwise position of the die-spindle, or in other words, that the shifting of said lever may be caused to take place at varying positions in the advance of the die-spindle, and so that different lengths of thread may be thereby provided for.

While in the construction shown and with the method of threading employed the advancing movement of the die serves to determine the length of the thread to be cut by controlling the shifting of a clutch which changes the rotation of the die-spindle from one speed to another, this feature of having the length of the thread to be cut determined by the advancing movement of the die may be employed in connection with other methods of threading, as for instance where the running off of the die is effected by reversing the direction of rotation of either the work-spindle or the die, in which case the advancing movement of the die may serve to control the shifting of a clutch to effect such reversal in the direction of rotation.

In the construction shown the third tool-carrier is arranged to carry but a single tool, which tool may be a pointing tool or any other tool that may be desired to operate upon the work after the operation of the threading dies, or when the rod of stock has been brought to the next indexed position. This third tool-carrier in the construction shown consists simply of a tool-spindle 179 mounted to reciprocate in the bed-plate 83ᵃ to advance and retract the tool carried thereby. Secured to said tool-spindle 179 is a downwardly extending arm 180 which works in an elongated slot formed in the bed-plate 83ᵃ. Said arm carries the roll 181 arranged to be engaged by the cams 182 on the cam-drum 90.

In addition to the three tool-carriers above described, and all of which carry tools which in their operation move longitudinally with relation to the work, the machine shown in the drawings is provided with three cross-slides or tool-carriers, which tool-carriers move transversely with relation to the work. In the construction shown one of these cross-slides is arranged at the front of the machine and the other two cross-slides are arranged at the rear of the machine. The cross-slide at the front of the machine is arranged so that the tool carried thereby will operate upon the rod of stock when said rod is in the position to be operated upon by the first turning-tool and which, for convenience, may be referred to as the first position of said rod. The two cross-slides at the rear of the machine are arranged so that the two tools carried thereby may operate upon the rod in one and the same indexed position and which, as shown, is the position of the rod when operated upon by the pointing-tool and which may be referred to as the fourth position of said rod. Any suitable or desired tools may be carried in these cross-slides, according to the work which is desired to be performed. As shown in the drawings, the cross-slide at the front of the machine carries a tool adapted for shaping the rod, which tool may operate either before or after the operation of the first turning-tool, or in conjunction therewith. Of the two cross-slides at the rear of the machine, one is shown as carrying a forming-tool or sizing-tool and the other as carrying a cutting-off tool.

The cross-slide 183 at the front of the machine is mounted to slide on ways on the bed. Adjustably mounted on the cross-slide 183 is a tool-carrier 184 carrying the tool 185. The cross-slide 183 is provided with a downward projection 186 carrying a roll 187 arranged to be engaged by cams 188 on the cam-drum 189 secured to the cam-shaft 53 which extends crosswise of the machine. For the purpose of limiting the inward movement of the cross-slide said slide is provided with an adjustable stop-screw 190 mounted in a lug 191 and arranged to come in contact with a fixed stop 192.

The construction and arrangement of the cross-slide 193 at the rear of the machine is the same as the construction and arrangement of the cross-slide at the front of the machine already described. Adjustably mounted on the cross-slide 193 is a tool-carrier 194 carrying the tool 195. The roll 196 carried by the downward projection 197 is adapted to be engaged by the cams 198 on the cam-drum 199 carried by the cam-shaft 53. The other cross-slide 200 at the rear of the machine is arranged at an angle to the cross-slide 193 and is arranged to slide on ways formed on a bracket 201 secured to the bed of the machine. As shown no separate tool-carrier is employed in connection with this cross-slide, but the tool 202, which is a cutting-off tool, is mounted directly in the cross-slide. Pivoted to the bracket 201 at 203 is a lever 204, one end of which is connected to the cross-slide 200 and the other end of which is provided with a roll 205 arranged to be engaged by cams 206 on the cam-drum 199. The cam-shaft 53 is connected with the shaft 91 by bevel-gears 207, 208.

Provision is made for operating the shaft 91 at two different speeds, as follows: Secured to said shaft is a worm-wheel 209 which engages a worm 210 on the shaft 211. Secured to said shaft 211 is a bevel-gear 212 which meshes with a bevel-gear 213 on the shaft 214. Secured to said shaft 214 adjacent to the bevel-gear 213 is a spur-gear 215 which meshes with the spur-gear 216 loosely mounted on the shaft 217. The gear 216 is provided on one side with the clutch-member 218 adapted to engage the clutch-member 219 secured to said shaft 217, and said gear is provided on its opposite side with a clutch-member 220 adapted to engage a clutch-member 221 secured to a gear 222 loosely mounted on said shaft 217. Said gear 222 meshes with the gear 223 fast on the shaft 122, which is operated from the driving pulley 118 through the clutches 120 and 121, whereby a constant fast speed is given to the clutch-member 221. The clutch-member 219, as above stated, is fast on the shaft 217, to which shaft is secured a gear 224. Said gear 224 meshes with a gear 225 secured to a sleeve mounted on an intermediate stud 226. Secured to the same sleeve is another gear 227 which meshes with a gear 228 on the shaft 40. The gearing through which the shaft 217 is connected to the shaft 122 is such as to give a relatively slow speed to the clutch-member 219, and as the gears 224, 225, 227 and 228 are all change gears, the slow speed of said clutch-member 219 may, by changing said gears, be varied at will. As will be seen, therefore, a constant fast speed is given to the clutch-member 221, while a variable slow speed may be given to the clutch-member 219, and consequently the shaft 91 will be rotated at a fast speed, or at the varying slow speed, according as the gear 216 and the clutches carried thereby are shifted in one direction or the other.

For shifting the gear 216 and its clutch-members a rock-shaft 229 is mounted in suitable bearings, which rock-shaft extends crosswise of the machine, as shown in Fig. 11, and carries at one end the fork 230 which engages a suitable groove in the hub of the gear 216 and is provided at the other end with a rock-arm 231. A link 232 connects the rock-arm 231 with an arm 233 loosely pivoted on a stud 234. Loosely pivoted on said stud 234 is a double arm lever 235, one arm 236 of which carries a roll 237 arranged to be acted upon by the wedge-shaped head 238 of a spring-pressed plunger 239. The arm 236 of the lever 235 is provided with a fork 240 projecting laterally therefrom, and the pivoted arm 233 is provided with a lateral projection 241 which extends between the arms of the fork 240 (see Fig. 15). A suitable amount of lost motion is provided between the projection 241 and the arms of the fork 240. The other arm 242 of the lever 235 carries a tubular support 243 in which is mounted the sliding rod 244, which rod is provided at one end with a knob 245 and at the other end with a roll 246 arranged to be engaged by cams 247 on the cam-wheel 248 secured to the shaft 91. A spring 249 is arranged to act on the rod 244 to keep the roll 246 normally in the path of the cams 247, but by pulling said rod outward the roll may be withdrawn out of the path of said cams. With this construction, as will be seen, the gear 216 and the clutches carried thereby will be shifted at the proper times, first in one direction and then in the other by the action of the spring-pressed plunger 239 when the proper cam 247 has moved the roll 237 past the apex or the wedge-shaped head 238 of said plunger in one direction or the other, thereby giving to the shaft 91 a fast and a slow speed alternately. It will be understood that the construction is such that the shaft 91 is revolved at the slow speed during the time it is operating to advance the several tool-carriers, and is revolved at the fast speed during the time it is operating to retract said tool-carriers.

It is desirable at times to move the gear 216 and the clutches carried thereby out of engagement with both of the fellow clutch-members and to lock the same out of engagement, and means are provided for this purpose. Pivoted in a suitable bearing 250 is a hand-lever 251 which is provided on the opposite side of its pivot with a projection 252 provided with two cam-faces 253 and 254, arranged one on each side of the pin 255 which connects the link 232 with the arm 233, the projection 252 of said lever being arranged at one side of and adjacent to said link and arm, and the connecting pin 255 being extended to project into the space between said cam-faces 253, 254. At the junction of the cam-faces 253, 254, is a recess or pocket 256. When the gear 216 and its clutches are moved into position to throw in the high speed mechanism the link 232 will be moved in a direction to bring the pin 255 in engagement with the cam-surface 253, as shown in Fig. 16, and when said gear 216 and its clutches are moved to a position to throw in the slow speed mechanism the link 232 will be moved in a direction to bring the pin 255 into engagement with the cam-surface 254. It will thus be seen that in whichever of these two positions said gear 216 may be, a swinging of the hand-lever 251 will, by the action of one or the other of said cam-surfaces upon the pin 255, cause the link 232 to be moved in one direction or the other, as the case may be, until the pin 255 has been brought into the recess or pocket 256 of the projection 252, at which time said link 232 and the gear 216 will have been moved to a position where said gear 216 and its clutch-members will be out of engagement with both of the fellow clutch-members and will be held in that position as long as the pin 255 remains in said pocket. The movement of the link 232 by the lever 251 will be accompanied by a corresponding movement of the arm 233 to which said link is connected, and the construction is such that the movement of said arm 233 under the action of said lever will serve to bring the roll 237 on the arm 236 nearly, but not quite, to the apex of the wedge-shaped head 238 of the spring-pressed plunger 239. Consequently whenever the hand-lever 251 is again moved to unlock or release the gear 216, said gear will be shifted by said spring-pressed plunger back into the position from which it was moved by the operation of the hand-lever.

In the machine shown means are provided for facilitating the introduction of a new rod or rods of stock, such means including a convenient arrangement for opening and closing the chuck or chucks by hand. For holding the feed-tubes in proper position with the grooves 17 in the collars 16 in line with the projection 20 on the feed-lever 18, and so that as the work-spindle turret is indexed the grooves 17 in each of the feed-tubes will be brought successively into engagement with said projection 20, a transverse guide 257 is employed which is constructed and arranged to enter the grooves 17 and hold the feed-tubes in proper position, except when the feed-tube is operated by the feed-lever. In inserting a new rod of stock considerable power is required to force the rod through the spring-fingers of the feed-tube, which power is usually applied by hammering the end of the rod. With the employment of the transverse guide referred to the force of the hammer blows is transmitted to a considerable extent upon the transverse guide, which is objectionable. To overcome this objection a series of recesses 258 are formed in the transverse guide 257, as shown in Fig. 5, of sufficient depth to permit the collars 16 on the feed-tubes to pass by the transverse guide. These recesses 258 are preferably formed at points mid-way between the normal indexed positions of the work-spindle, and so that by giving to the work-spindle turret an eighth of a turn, the feed-tubes and the collars thereon will be brought in line with said recesses 258.

For the purpose of opening one or more of the chucks when the work-spindle turret has been thus turned an eighth of a turn, the end of the central shaft 8 is provided with a slot 259 adapted to receive the end of a hand-lever 260 (see Fig. 17), said lever being pivoted to said shaft by means of a transverse pin 261 which extends through the slotted end of the shaft 8 and through the end of the lever 260. Said lever 260 is provided with a suitable projection, preferably a roll 262, adapted to enter the groove 14 in the collar 13 by which the chuck-jaws are operated. In Fig. 17 the projection or roll 262 on said lever is shown in engagement with the collar 13 on the work-spindle which occupies the uppermost position, as shown in said Fig. 17. It will be seen that by properly manipulating said lever 260 the chuck-jaws of said spindle may be opened and closed by means of said lever. By removing the lever 260 and turning the same half around, and reinserting the lever in the slot 259, the projection or roll 262 will be brought into engagement with the collar 13 on the work-spindle at the right in Fig. 17, and so that thereby the chuck-jaws of that spindle may likewise be opened and closed by hand. By again removing the lever 260 and inserting the same in the slot 259 in the shaft 8 from the opposite side, as indicated in dotted lines in Fig. 17, the chuck-jaws on the other work-spindles may be likewise opened and closed by means of said lever.

By the construction above described, when the chuck-jaws of a given spindle have been opened by means of the hand-lever 260, a rod of stock may be inserted in said spindle, and when the forward end of said rod comes into engagement with the spring-fingers of the feed-tube, the feed-tube will be carried forward with the rod until the collar 16 of the feed-tube comes into engagement with the rear of the spindle, in which position the force of the hammer blows employed in driving in the rod will be transmitted to and borne by the solid structure of the spindle. As will be seen, the insertion of new rods of stock in all four of the spindles involves no further manipulation than simply a shifting of the hand-lever 260, and the successive operations of the several chucks thereby.

With the operation of the several chuck-jaws by the hand-lever 260 above described there is a possibility that the operator, after opening the chuck-jaws and inserting the rod of stock, may omit to operate the lever 260 to again close the chuck-jaws, which would result in leaving the groove 14 in the collar 13 out of line with the projection 16 on the chuck-operating lever 15, and in a position where one of the flanges of said collar 13 would be in line with said projection. If this happened there would be danger when the work-spindle turret was next indexed, that the projection 16, or possibly even the flange of the collar 13, would be broken. To guard against this the projection 16, instead of being made rigid with the chuck-operating lever 15, is made in the form of, or is connected with, a spring-pressed plunger 263 mounted in said chuck-operating lever, as shown in Fig. 18. With this construction, if the flange of the collar 13, when the work-spindle turret is next indexed, is in line with the projection 20, the engagement of said flange with said projection will, by the indexing movement of the turret, force said projection 16 inward so that no damage will be done, and when the upper end of the chuck-operating lever is at the proper time moved forward by its operating cam, the projection 16 will, by the action of its spring-pressed plunger, be thrown forward so as to enter the groove 14 in said collar 13.

It is sometimes desirable to operate the chuck-operating lever 15 by hand for the purpose of testing the grip or tension of the chuck-jaws or otherwise, and for this purpose said chuck-lever is provided with a recess 264 adapted to receive a suitable pin by which said chuck-lever may be operated, the cams for actuating said lever being of such construction as to permit this to be done.

While the several tool-carriers may be retracted by the cams provided therefor, it is preferred to employ in connection with each carrier a spring for retracting the same, leaving the retracting cam in each case to act merely as a safety device to retract the carrier if, for any reason, the retracting spring fails to operate. The advantage of thus employing a spring to retract the tool-carrier is that thereby the carrier will begin to be retracted as soon as the coöperating member has passed the high point of the advancing cam.

The operation of the several parts of the machine has been described in connection with the description of the construction thereof, and a general description of the operation of the machine as a whole is all that will be further necessary.

With the machine set up for a given line of work and supplied with the necessary rods of stock, and with suitable tools in the several tool-carriers for operating thereon, and assuming that each of the four rods has been successively fed forward and operated upon by the several tools, and that the first rod has been again fed forward preparatory to being operated upon, the general operation of the machine is as follows: The tool-carrier 82, which may be assumed to carry two turning-tools, advances, one of said tools operating to make a roughing cut on the rod of stock last fed forward and held in the first indexed position, while the other tool operates simultaneously to make a finishing cut on the rod of stock in the second indexed position, while at the same time the tool carried by the cross-slide 183 may likewise operate upon the rod last fed forward to size the same or perform any other desired operation thereon. At the same time the die-spindles 93 in the turret 92 are advanced and the die in one of these spindles operates upon the rod in the third indexed position to partially form the screw-thread thereon. The time required for the operation of this roughing-die is much less than the time required for the operation of the turning-tools, and after said roughing-die has operated to partially cut the screw-thread said die-spindles 93 are retracted and the turret 92 is indexed to bring the other die-spindle in line with the same rod of stock in the same indexed position, and the die-spindles are then again advanced and the die in the second spindle operates to finish the cutting of the thread on that rod. Thus both of said dies are caused to operate successively within the time occupied by the operation of the turning-tools. At the same time also the tool-carrier or spindle 179, which may be assumed to carry a pointing or other forming-tool, is likewise advanced by its mechanism to operate upon the rod of stock in the fourth indexed position. The time required for the operation of this pointing-tool is likewise much less than the time required for the operation of the turning-tools, and by having this pointing or other tool mounted in a separate carrier said pointing or other tool may be advanced and do its work and be retracted while the turning-tools are operating. This make it possible to have the cutting-off tool or other cross-slide tool or tools operate upon the rod of stock in said fourth indexed position after the pointing-tool has operated, and thus without requiring a separate and additional work-spindle and a separate and additional indexing of the work-spindle turret for the operation of said cutting-off tool or other cross-slide tool, as would be required if the pointing-tool were mounted in the same carrier with the turning-tool. This results in a material saving of time and furthermore enables a machine provided with four work-spindles to perform the same work that would otherwise require a machine provided with five work-spindles. So also the mounting of the two die-spindles in a carrier separate from the carrier for the turning-tools enables two die-spindles to operate upon a given rod of stock in one and the same indexed position, and this likewise not only saves the intermediate indexing, but lessens by one the number of work-spindles required to be employed. Thus with the present machine, with its three separate carriers constructed and organized as described, a machine provided with four work-spindles is capable of producing the work which would otherwise require, in a machine in which the operating tools were all mounted in a single carrier, six work-spindles and six indexings.

In the machine shown in the drawings, in which there are two cross-slides at the rear of the machine, there are in fact three operations performed upon the rod in its fourth indexed position and while the two turning-tools are operating upon the rods in the first and second indexed positions. Thus at the same time that the pointing-tool is advanced and operates, the cross-slide 193 is advanced and so that the tool 195 therein, which may be a forming or sizing-tool, may operate at the same time upon the rod, and then when the pointing-tool and the sizing-tool have completed their operations, the cross-slide 200 will be advanced and the cutting-off tool operate to cut off the finished article from the rod.

When the several tools have operated as above described the work-spindle turret is unlocked and indexed a quarter turn, and at the completion of the indexing operation the chuck-jaws of the spindle, which has now been brought into what has been called the first indexed position, are opened and the rod of stock therein fed forward, the swinging stop 24 having at the proper time been brought into position to limit or gage the forward feed of said rod, and the chuck-jaws are then closed and the operation of the several tools is again performed upon the series of rods in their new indexed position.

It will be understood that an important feature of the machine consists in providing means in connection with the indexing of the work-turret and the feeding of the rods of stock whereby the mechanism for performing one operation serves to set in motion the mechanism for performing the next succeeding operation. This serves to insure that the several operations shall take place at the proper times and in the proper order with relation to each other. It will also be seen that the indexing of the work-spindle turret is effected by a shaft, viz., the shaft 36, which is entirely separate and independent from the main cam-shaft of the machine, and that thus the indexing of the turret is independent of the advancing and retracting movements of the tool-carriers, the speed of the indexing of said turret depending solely upon the speed of the separate and independent shaft by which such indexing is performed. It will further be seen that by thus providing a separate and independent shaft for indexing the work-spindle turret and operating said shaft independently from the main cam-shaft, the power may be disconnected from the main cam-shaft, so that said main cam-shaft may be operated by hand without cutting off the power from the shaft which operates to index the work-spindle turret. While in the normal operation of the machine the clutch which controls the operation of the independent shaft referred to is tripped by or through the main cam-shaft, means may be, and as shown in the drawings are, provided for tripping said clutch by hand, such means consisting of the push rod 58$^a$ adapted to engage the lower end of the lever 58, as shown in Fig. 8. Consequently the main cam-shaft may be disconnected from the power and operated by hand, and then when desired the clutch referred to may be tripped and the work-spindle turret indexed by power. So also with this construction the work-spindle turret may be indexed by power without rotating the cam-shaft at all. This is a material advantage under certain conditions. Thus supposing that for any reason it be desired to cut off the projecting ends of the rods of stock, this may be done by moving in the cross-slide which carries the cutting-off tool by hand and by indexing the spindle-turret by power each rod may be easily and successively brought into position to be cut-off.

Not only is the indexing of the work-spindle turret effected by a shaft independent of the main cam-shaft, but so also is the indexing of the die-spindle turret likewise effected by a shaft, viz., shaft 113, which is separate and independent from the main cam-shaft. Thus the die-spindle turret may also be indexed by power without the rotation of the main cam-shaft, the clutch for said separate shaft 113 being likewise tripped by hand.

Another important feature of the machine consists in the mounting of the two die-spindles in a rotary turret, whereby two dies may be employed and both of said dies caused to operate upon the rod in the same indexed position. As will be understood, this feature of invention is not limited to use in connection with die-spindles, but instead any other suitable tools may be mounted in such turret, whenever the tools are of such character that two or more tools may operate upon the work while the tools in the carrier 82 are operating. It will be further noted that the means for simultaneously advancing and retracting the die-spindles is of such a character that the turret carrying the same may be indexed whatever may be the lengthwise position of said spindles.

As hereinbefore stated, the machine is provided with means for rotating each die-spindle at two different speeds in the same direction and at a third speed in the opposite direction, and is also provided with means for holding the die-spindle stationary while the work-spindle revolves. This construction makes provision for the employment of various tools other than dies, such as a drill, a reamer, or other tool, and for producing an operating speed as between the tool and the work best adapted for the particular tool employed.

As heretofore explained, the construction is such that the length of the thread to be cut is determined by the lengthwise movement of the die itself, which insures greater accuracy in determining the length of the thread than when the same is determined by a cam or some other independent means. Moreover with such arrangement different lengths of thread may be readily provided for without changing the cam for advancing the die-spindle. It will be further seen that by controlling the operation of the stop which limits or gages the feed of the rod by the same shaft which operates the feed mechanism said stop will always be operated at the proper time with relation to the feed mechanism, and will be certain to be brought to the proper position when the rod is fed forward. It will be further understood that by the combination and coöperation of the several features referred to, a machine is produced which will operate with great accuracy and rapidity, which is adapted for the performance of a wide range of work, and which will produce a large amount of product with a limited number of work-spindles. Moreover the machine has the capacity for various manipulations and operations not possessed by prior machines.

As will be understood, the construction of the several parts may be greatly varied without departing from the main and characteristic features of the invention.

What I claim as my invention and desire to secure by Letters Patent is:

1. The combination of a turret, mechanism for indexing said turret, mechanism for locking and unlocking said turret, and means independent of said unlocking mechanism for starting said indexing mechanism, means whereby the operation of said starting means is controlled by the operation of said unlocking mechanism.

2. The combination of a turret, mechanism for indexing said turret, a locking bolt for locking said turret, mechanism for withdrawing said locking bolt, and means independent of said withdrawing mechanism for starting said indexing mechanism, means whereby the operation of said starting means is controlled by the operation of said unlocking mechanism.

3. The combination of a turret, mechanism for indexing said turret, mechanism for locking and unlocking said turret, means for holding said indexing-mechanism inoperative, and means controlled by said unlocking-mechanism for releasing said holding-means, substantially as described.

4. The combination of a turret, mechanism embodying a shifting clutch for indexing said turret, mechanism for locking and unlocking said turret, means for holding said indexing clutch inoperative, and means controlled by said unlocking mechanism for releasing said holding means.

5. The combination of a turret, mechanism for indexing said turret, mechanism for locking and unlocking said turret, means whereby the indexing of said turret is controlled by said unlocking-mechanism, and a safety device adapted to prevent said indexing-mechanism from operating until said unlocking-mechanism has operated to unlock said turret, substantially as described.

6. The combination of a turret, mechanism for indexing said turret, mechanism for locking and unlocking said turret, and means for controlling the operation of said locking-mechanism from said indexing-mechanism, substantially as described.

7. The combination of a turret, spindles therein provided with chucks, mechanism for indexing said turret, and mechanism for operating said chucks, said chuck-mechanism being provided with means whereby it is adapted to be thrown into action by the operation of said indexing mechanism, substantially as described.

8. The combination of a turret, spindles therein provided with chucks, mechanism for indexing said turret, mechanism for operating said chucks, and means whereby the operation of said chuck-mechanism is controlled by said indexing-mechanism, substantially as described.

9. The combination of a turret, spindles therein provided with feeding-devices, mechanism for indexing said turret, and mechanism for operating said feeding-devices, said feed-mechanism being provided with means whereby it is adapted to be thrown into action by the operation of said indexing-mechanism, substantially as described.

10. The combination of a turret, spindles therein provided with feeding-devices, mechanism for indexing said turret, mechanism for operating said feeding-devices, and means whereby the operation of said feed-mechanism is controlled by said indexing-mechanism, substantially as described.

11. The combination of a turret, spindles therein provided with work-holding chucks and with feeding-devices, mechanism for indexing said turret, mechanism for operating said chucks, and mechanism for operating said feeding-devices, said chuck and feed-mechanisms being provided with means whereby they are adapted to be thrown into action by the operation of said indexing-mechanism, substantially as described.

12. The combination of a turret, spindles therein provided with chucks and with feeding-devices, mechanism for indexing said turret, mechanism for operating said chucks and said feeding-devices, and means whereby the operation of said chuck and feed-mechanism is controlled by said indexing-mechanism, substantially as described.

13. The combination of a turret, spindles therein provided with work-holding chucks and with feeding-devices, mechanism for indexing said turret, a cam-shaft for operating said chucks and said feeding-devices, and means whereby the operation of said cam-shaft is controlled by said indexing-mechanism, substantially as described.

14. The combination of a turret, spindles therein provided with work-holding chucks and with feeding-devices, mechanism for indexing said turret, a cam-shaft for operating said chucks and said feeding-devices, means for holding said cam-shaft inoperative, and means controlled by said indexing-mechanism for releasing said holding-means, substantially as described.

15. The combination of a turret, spindles therein provided with work-holding chucks and with feeding-devices, mechanism for indexing said turret, mechanism embodying a shifting-clutch for operating said chucks and said feeding-devices, and means controlled by said indexing-mechanism for operating said shifting-clutch to start said chuck and feed-mechanism, substantially as described.

16. The combination of a turret, a tool-carrier, a continuously rotating cam-shaft for advancing and retracting said tool-carrier toward and from said turret, and a separate and independent shaft for indexing said turret, substantially as described.

17. The combination of a turret, a tool-carrier, a continuously rotating cam-shaft for advancing and retracting said tool-carrier toward and from said turret, and a separate and independent intermittently rotated shaft for indexing said turret, substantially as described.

18. The combination of a turret, a tool-carrier, a cam-shaft for advancing and retracting said tool-carrier toward and from said turret, a separate and independent intermittently rotated shaft for indexing said turret, and means whereby the operation of said intermittently rotated shaft is controlled by said cam-shaft, substantially as described.

19. The combination of a turret, a tool-carrier, a cam-shaft for advancing and retracting said tool-carrier toward and from said turret, means for rotating said cam-shaft at two different speeds, and an intermittently rotated constant speed shaft for indexing said turret, substantially as described.

20. The combination of a turret, a tool-carrier, a cam-shaft for advancing and retracting said tool-carrier toward and from said turret, means for rotating said cam-shaft at two different speeds, an intermittently rotated constant speed shaft for indexing said turret, and means whereby the operation of said last mentioned shaft is controlled by said cam-shaft, substantially as described.

21. The combination of a work-turret, a tool-turret, means for indexing said work-turret, and means for indexing said tool-turret while the work-turret is in indexed position, substantially as described.

22. The combination of a work-turret provided with longitudinally arranged spindles, a tool-turret provided with longitudinally arranged spindles, said turrets being arranged out of line with each other, and means for indexing each of said turrets, substantially as described.

23. The combination of a work-turret and a tool-turret so arranged with relation to said work-turret that each of the tools in said tool-turret may operate in turn upon a piece of work held in said work-turret in the same indexed position, substantially as described.

24. The combination of a work-turret, a tool-turret so arranged with relation to said work-turret that each of the tools in said tool-turret may operate in turn upon a piece of work held in said work-turret in the same indexed position, and means for indexing said tool-turret, substantially as described.

25. The combination of a work-turret, a tool-turret so arranged with relation to said work-turret that each of the tools in said tool-turret may operate in turn upon a piece of work held in said work-turret in the same, said tool-turrets as many times as there are tools in said turret for each advance and retraction of said tool-carrier, substantially as described.

26. The combination of a work-turret, a tool-turret so arranged with relation to said work-turret that each of the tools in said tool-turret may operate in turn upon a piece of work held in said work-turret in the same indexed position, means for advancing and retracting said tools, means for indexing said tool-turret, and means for again advancing and retracting said tools, substantially as described.

27. The combination of a work-turret, a tool-carrier, a tool-turret so arranged with relation to said work-turret that each of said tools in said tool-turret may operate upon a piece of work held in said work-turret in the same indexed position, means for advancing and retracting said tool-carrier, and means for advancing and retracting each of said turret-tools in its operative position during a single advance and retraction of said tool-carrier, substantially as described.

28. The combination of a work-turret, a tool-carrier, a tool-turret so arranged with relation to said work-turret that each of the tools in said tool-turret may operate in turn upon a piece of work held in said work-turret in the same indexed position, means for advancing and retracting said tool-carrier, and means for advancing and retracting said turret-tools as many times as there are tools in said turret for each advance and retraction of said tool-carrier, substantially as described.

29. The combination of a work-turret, a tool-carrier, a tool-turret so arranged with relation to said work-turret that each of the tools in said tool-turret may operate in turn upon a piece of work held in said work-turret in the same indexed position, means for advancing and retracting said tool-carrier, means for advancing and retracting said turret-tools twice for each advance and retract of said tool-carrier, and means for indexing said tool-turret between the two advances of said turret-tools, substantially as described.

30. The combination of a work-turret and a tool-turret carrying two threading dies, one for partially cutting a thread and the other for finishing the same, substantially as described.

31. The combination of a work-turret, a tool-turret carrying two threading-dies, one for partially cutting a thread and the other for finishing the same, said tool-turret being so arranged with relation to said work-turret that both of said threading-dies may operate upon a piece of work held in said work-turret in the same indexed position, substantially as described.

32. The combination of a work-turret, a tool-turret carrying two threading-dies, one for partially cutting a thread and the other for finishing the same, said tool-turret being so arranged with relation to said work-turret that both threading-dies may operate upon a piece of work held in said work-turret in the same indexed position, and means for indexing said tool-turret, substantially as described.

33. The combination of a work-turret, a tool-turret so arranged with relation to said work-turret that each of the tools in said tool-turret may operate in turn upon a piece of work held in said work-turret in the same indexed position, means for advancing and retracting said turret-tools, and independent means for indexing said tool-turret, substantially as described.

34. The combination of a work-turret, a tool-turret so arranged with relation to said work-turret that each of the tools in said tool-turret may operate in turn upon a piece of work held in said work-turret in the same indexed position, means for advancing and retracting said turret-tools, and an independent intermittently rotated shaft for indexing said tool-turret, substantially as described.

35. The combination of a tool-turret, rotary tool-spindles longitudinally movable therein, means comprising a connection between said spindles for simultaneously advancing and retracting said tool-spindles, and means for indexing said turret, substantially as described.

36. The combination of a tool-turret, rotary tool-spindles longitudinally movable therein, adjustable means for simultaneously advancing and retracting said tool-spindles, and means for indexing said turret in any position of the tool-spindles, substantially as described.

37. The combination of a tool-turret, rotary tool-spindles longitudinally movable therein, adjustable means for indexing said turret, and means in constant engagement with said tool-spindles for advancing and retracting the same, whereby said turret may be indexed whatever may be the longitudinal position of said spindles, substantially as described.

38. The combination of a work-spindle and means for rotating the same, of a tool-spindle, and means for rotating said tool-spindle at two different speeds in the same direction and at a third speed in the opposite direction, substantially as described.

39. The combination of a work-spindle and means for rotating the same, of a tool-spindle, and means for rotating said tool-spindle at two different speeds in the same direction and at a third speed in the opposite direction, and means for holding said tool-spindle against rotation, substantially as described.

40. The combination of a work-turret and a tool-turret carrying two rotating tools, one for taking a roughing cut and the other for taking a finishing cut, substantially as described.

41. The combination, with a work-turret and means for indexing the same, of a tool-turret, means for indexing the same while the work-turret is in indexed position, two tool-spindles carried in said turret, and means for rotating each of said tool-spindles, substantially as described.

42. The combination, with a work-spindle and means for rotating the same, of a tool-turret, two tool-spindles carried in said turret, and means for rotating each of said tool-spindles at two different speeds, substantially as described.

43. The combination, with a work-spindle and means for rotating the same, of a tool-turret, two tool-spindles carried in said turret, and means for rotating each of said tool-spindles at two different speeds in the same direction and at a third speed in the opposite direction, substantially as described.

44. The combination, with a work-spindle and means for rotating the same, of a tool-turret, two screw-cutting dies carried in said turret, one for partially cutting a thread and the other for finishing the same, and means for rotating each of said dies at two different speeds in the same direction, substantially as described.

45. The combination, with a work-spindle and means for rotating the same, of a tool-turret, two screw-cutting dies carried in said turret, one for partially cutting a thread and the other for finishing the same, and means for rotating each of said dies at two different speeds in the same direction and at a third speed in the opposite direction, substantially as described.

46. The combination, with a work-spindle and means for rotating the same, of a tool-turret, two screw-cutting dies carried in said turret, one for partially cutting a thread and the other for finishing the same, means for rotating each of said dies at two different speeds in the same direction and at a third speed in the opposite direction, and means for holding each of said dies against rotation, substantially as described.

47. The combination of a work-spindle, a threading die, means for rotating said spindle or said die to cut a thread, a shifting clutch for effecting the running off of the die, a spring-pressed plunger for shifting said clutch, and means controlled by the advancing movement of said die for releasing said plunger to shift said clutch, substantially as described.

48. The combination, of a work-spindle, a threading die, means for rotating said spindle or said die to cut a thread, a shifting clutch for effecting the running off of the die, a spring-pressed plunger for shifting said clutch, a cam for setting up a tension in the spring of said plunger, a latch for holding said plunger from operating, and means controlled by the advancing movement of said die for operating said latch to release said plunger, substantially as described.

49. The combination of a work-spindle, means for rotating the same, a die, means for rotating said die at two different speeds in the same direction, a shifting-clutch for changing the rotation of said die from one speed to another, a spring-pressed plunger for shifting said clutch, and means controlled by the advancing movement of said die for releasing said plunger to shift said clutch, substantially as described.

50. The combination of a work-holding spindle, means for rotating the same, a die, means for rotating said die at two different speeds in the same direction, a shifting-clutch for changing the rotation of said die from one speed to another, a spring-pressed plunger for shifting said clutch, a cam for setting up a tension in the spring of said plunger, a latch for holding said plunger from operating, and means controlled by the advancing movement of said die for operating said latch to release said plunger, substantially as described.

51. The combination of a work-spindle, a threading-die, means for rotating said spindle or said die to cut a thread, mechanism for positively advancing said die to engage the die with the work, and means for adjusting the connection between said die and said advancing mechanism, whereby the extent of the positive advance of said die may be the same for different lengths of screws, substantially as described.

52. The combination of a work-spindle, a threading-die, means for rotating said spindle or said die to cut a thread, a cam for positively advancing said die to engage the die with the work, and an adjustable connection between said cam and said die, whereby the position of said die may be varied for different lengths of screws, but without varying the extent of the positive advance effected by said cam, substantially as described.

53. The combination of a work-turret, two tool-carriers movable toward and from said turret, a cross-slide, and means for actuating one of said tool-carriers and said cross-slide within the time required for the actuation of the other tool-carrier, substantially as described.

54. The combination of a work-turret, two tool-carriers movable toward and from said turret, a cross-slide, and means for actuating one of said tool-carriers and said cross-slide to operate upon one of the rods held in said turret while the other tool-carrier is actuated to operate upon another rod held in said turret, substantially as described.

55. The combination of a work-turret, two tool-carriers movable toward and from said turret, two cross-slides arranged to operate upon a rod in the same indexed position, means for actuating one of said tool-carriers and both of said cross-slides within the time required for the actuation of the other tool-carrier, substantially as described.

56. The combination of a work-turret, two tool-carriers, one carrying a tool to operate upon a rod held in one of the spindles of said turret and the other carrying a tool to operate upon a rod held in another spindle of said turret, separate means for advancing and retracting each of said tool-carriers, whereby one of said carriers may be advanced and retracted in less time than the other, a cross-slide, and means for moving said cross-slide to cause its tool to operate upon the same rod of stock as the more quickly operating tool, whereby said quickly operating tool and said cross-slide tool may both operate upon said rod during the time that the longer operating tool is operating upon its rod, substantially as described.

57. The combination of a work-spindle, means for feeding a rod of stock therethrough, and a movable stop operatively connected to said feed-mechanism for limiting the feed of said rod, substantially as described.

58. The combination of a work-spindle, means for feeding a rod of stock therethrough, a movable stop for limiting the feed of said rod, and operative connections between said stop and said feed-mechanism for moving said stop into and out of the path of said rod, substantially as described.

59. The combination of a work-spindle, means for feeding a rod of stock therethrough, a swinging stop for limiting the feed of said rod, and operative connections between said stop and said feed-mechanism for swinging said stop into and out of the path of said rod, substantially as described.

60. The combination of a work-spindle, means for feeding a rod of stock therethrough, a swinging stop for limiting the feed of said rod, operative connections between said stop and said feed mechanism for swinging said stop into and out of the path of said rod, said operative connections being constructed to hold said stop at rest for a time in front of said rod, substantially as described.

61. The combination of a tool-carrier, a cam-shaft for advancing and retracting said tool-carrier, a work-turret, an independently and intermittently rotated shaft for indexing said turret, the operation of which is normally controlled by said cam-shaft, and means for controlling the operation of said intermittently rotated indexing shaft by hand, whereby said cam-shaft may be stopped without interfering with the operation of the mechanism for indexing said turret, substantially as described.

62. The combination of a work-turret, a series of spindles carried thereby, a series of feed devices, and a transverse guide adapted to engage said feed devices to hold the same against lengthwise movement, said transverse guide being provided with a series of recesses corresponding to the number of spindles, whereby when said turret is moved from its normal indexed position said feed devices may be moved lengthwise with relation to said transverse guide, substantially as described.

63. The combination of a work-turret, a series of spindles carried thereby, said spindles being provided with chucks, and means for operating one or more of said chucks by hand, substantially as described.

64. The combination of a work-turret, a series of spindles carried thereby, said spindles being provided with chucks and detachable means for operating two or more of said chucks by hand without indexing the turret, substantially as described.

65. The combination of a work-turret, a series of spindles carried thereby, said spindles being provided with chucks, sliding collars for operating said chucks, a central shaft for rotating said spindles provided with means for attaching a hand-lever thereto, said lever being provided with a projection to engage one of the sliding collars for operating one of said chucks, substantially as described.

66. The combination of a work-turret, means for indexing said turret, a series of spindles carried thereby, said spindles being provided with chucks, sliding collars for operating said chucks, and a cam-operated lever provided with a yielding projection for engaging said collars successively as the turret is indexed, substantially as described.

GEORGE H. NEWTON.

Witnesses:
W. H. THURSTON,
C. G. BRADLEY.